(12) United States Patent
Kakii

(10) Patent No.: US 7,634,654 B2
(45) Date of Patent: Dec. 15, 2009

(54) METHOD OF NULLIFYING DIGITAL CERTIFICATE, APPARATUS FOR NULLIFYING DIGITAL CERTIFICATE, AND SYSTEM, PROGRAM, AND RECORING MEDIUM FOR NULLIFYING DIGITAL CERTIFICATE

(75) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 892 days.

(21) Appl. No.: 11/030,465

(22) Filed: Jan. 7, 2005

(65) Prior Publication Data

US 2005/0188196 A1 Aug. 25, 2005

(30) Foreign Application Priority Data

Jan. 9, 2004 (JP) ............................. 2004-004720
Dec. 13, 2004 (JP) ............................. 2004-360616

(51) Int. Cl.
*G06F 21/00* (2006.01)
(52) U.S. Cl. .................................................. 713/158
(58) Field of Classification Search ................. 713/158, 713/156, 175
See application file for complete search history.

(56) References Cited

U.S. PATENT DOCUMENTS 7,409,553 B2 * 8/2008 Kumagai et al. ............ 713/175

FOREIGN PATENT DOCUMENTS

| JP | 2002-247028 | 8/2002 |
|---|---|---|
| JP | 2002-251492 | 9/2002 |
| JP | 2002-353959 | 12/2002 |
| JP | 2003-58049 | 2/2003 |
| JP | 2004-213652 | 7/2004 |

* cited by examiner

*Primary Examiner*—Gilberto Barron, Jr.
*Assistant Examiner*—Samson B Lemma
(74) *Attorney, Agent, or Firm*—Oblon, Spivak, McClelland, Maier & Neustadt, L.L.P.

(57) ABSTRACT

A method of nullifying digital certificates for nullifying, by means of a communications apparatus, a digital certificate for use by a communications counterpart of the communications apparatus in authenticating includes the step of causing the communications apparatus to transfer to the communications counterpart, when determining based on a normal certificate being a valid digital certificate received from the communications counterpart or information received via a communications path based on the normal certificate that the normal certificate is to be nullified, a certificate for nullifying being a digital certificate for nullifying.

16 Claims, 28 Drawing Sheets

FIG.5

```
Data (DATA SECTION)
    Version (VERSION OF X.509)
    Serial Number (SERIAL NUMBER)
    Signature Algorithm (ENCRYPTING ALGORITHM USED BY CA)
    Issuer (ISSUER OF CERTIFICATE)
    Validity (EXPIRATION DATE)
    Subject (TARGET TO BE CERTIFIED)
    Subject Public Key Info (INFORMATION REGARDING PUBLIC KEY OF
                             TARGET TO BE CERTIFIED)
        Public Key Algorithm (ALGORITHM OF PUBLIC KEY)
        RSA Public Key (PUBLIC KEY)
        X509v3 extensions (EXTENSIONS OF X.509 VERSION.3)
           . . .
Signature Algorithm (ENCRYPTING ALGORITHM USED BY CA)
Signature (DIGITAL SIGNATURE BY CA)
```

FIG.6

```
Data:
    Version: 3 (0x2)
    Serial Number: 101 (0x0)
    Signature Algorithm: md5WithRSAEncryption
A ── Issuer: C=JP, ST=Tokyo, L=Ohtaku, O=XXX Company, Ltd, CN=CA001
    ┌ Validity
B ─┤     Not Before: May 20 00:00:00 2002 GMT
    └    Not After : May 20 00:00:00 2003 GMT
C ── Subject: C=JP, ST=Tokyo, L=Ohtaku, O=XXX Company, Ltd, CN=Device-0123456
    Subject Public Key Info:
        Public Key Algorithm: rsaEncryption
        RSA Public Key: (1024 bit)
            Modulus (1024 bit):
            ┌─────────────────────────────┐
            │ PUBLIC KEY OF DEVICE-0123456│
            └─────────────────────────────┘
            Exponent: 65537 (0x10001)
Signature Algorithm: md5WithRSAEncryption
Signature:
    ┌─────────────────────┐
    │ SIGNATURE DATA BY CA001 │
    └─────────────────────┘
```

FIG.7

URL FOR COMMUNICATIONS DESTINATION

CERTIFICATE SET FOR NULLIFYING

- PUBLIC-KEY CERTIFICATE FOR NULLIFYING
- NORMAL PRIVATE-KEY FOR LOWER APPARATUS
- ROOT-KEY CERTIFICATE FOR UPPER-APPARATUS AUTHENTICATION

FIG.8

65 — URL:https://www.cal.co.jp

60 —
```
Machine Public Key:
Version: 3
Serial Number: 123
Signature Algorithm: md5WithRSAEncryption
Issuer: C=JP, ST=Tokyo, L=Ohtaku, O=XXX Company, CN=CA001
Validity
   Not Before: Jan  1 00:00:00 2000 GMT
   Not After : Dec 31 00:00:00 2005 GMT
Subject: C=JP, ST=Tokyo, L=Ohtaku, O=XXX Company, CN=Device-0123456
Subject Public Key Info:
   xxxxxxxxxxxxxxxxxxxxxxxxxxxxxxxxxxxxx
```

```
Machine Private Key:
Subject Private Key Info:
   xxxxxxxxxxxxxxxxxxxxxxxxxxxxxxxxxxxxx
```

```
Root Certificate:
Version: 3
Serial Number: 1
Signature Algorithm: md5WithRSAEncryption
Issuer: C=JP, ST=Tokyo, L=Ohtaku, O=XXX Company, CN=CA001
Validity
   Not Before: Jan  1 00:00:00 2000 GMT
   Not After : Dec 31 00:00:00 2010 GMT
Subject Public Key Info:
   xxxxxxxxxxxxxxxxxxxxxxxxxxxxxxxxxxxxx
```

FIG.16

| EQUIPMENT NUMBER | FLAG FOR NULLIFYING CERTIFICATE |
|---|---|
| ⋮ | ⋮ |
| 012-3456 | ON |
| 012-3457 | ON |
| ⋮ | ⋮ |
| 013-5001 | OFF |
| 013-5002 | OFF |
| ⋮ | ⋮ |

FIG.21

| PARAMETER | CONDITION | APPLYING? |
|---|---|---|
| COUNTRY CODE | JP | YES |
| MODEL | 1234 & 4567 | YES |
| MODEL | 1474 | NO |
| CERTIFICATE SERIAL | 1000 =< | NO |
| CERTIFICATE VERSION | 1.0 =< | NO |
| CERTIFICATE VALIDITY | JAN 1 00:00:00 2005 =< | NO |
| USER NAME | COMPANY A | NO |
| ⋮ | ⋮ | ⋮ |

FIG.22

| NUMBER | NAME | TELEPHONE NUMBER | FAX NUMBER | ADDRESS | AFFILIATION | COUNTRY CODE |
|---|---|---|---|---|---|---|
| 001 | AAA TRADING | xx-1234-5678 | xx-1234-5679 | B CITY, A PREF. | IMPORTS | JP |
| 002 | BBB CONSTRUCTION | xx-2234-5678 | xx-2234-5679 | C CITY, A PREF. | MATERIALS | JP |
| 003 | CCC MACHINERY | xx-3234-5678 | xx-3234-5679 | E CITY, D PREF. | GENERAL AFFAIRS | JP |
| 004 | CCC MACHINERY | yy-3234-5678 | yy-3234-5679 | E CITY, D PREF. | GENERAL AFFAIRS | JP |
| 005 | EEE TRADING | yy-7234-5678 | yy-7234-5679 | F CITY, D PREF. | ACCOUNTING | JP |
| 006 | FFF PRECISION | zz-6234-5678 | zz-6234-5679 | N CITY, M STATE | IMPORTS | XX |
| ... | ... | ... | ... | ... | ... | ... |

| DELIVERED DATE | EQUIPMENT NUMBER | MODEL CODE | CERTIFICATE SERIAL | CERTIFICATE VERSION | CERTIFICATE VALIDITY | ... |
|---|---|---|---|---|---|---|
| 96/01/10 | 1234-123456 | 1234 | xxxx | 1.0 | JAN 1 00:00:00 2005 | ...... |
| 97/01/10 | 4567-963258 | 4567 | xxxx | 2.0 | JAN 1 00:00:00 2010 | ...... |
| 97/01/22 | 1474-258963 | 1474 | xxxx | 1.0 | JAN 1 00:00:00 2005 | ...... |
| 96/10/10 | 1234-987654 | 1234 | xxxx | 1.0 | JAN 1 00:00:00 2005 | ...... |
| 96/09/10 | 1234-852147 | 1234 | xxxx | 1.0 | JAN 1 00:00:00 2006 | ...... |
| 97/01/10 | 1234-741369 | 1234 | xxxx | 1.0 | JAN 1 00:00:00 2006 | ...... |
| ... | ... | ... | ... | ... | ... | ... |

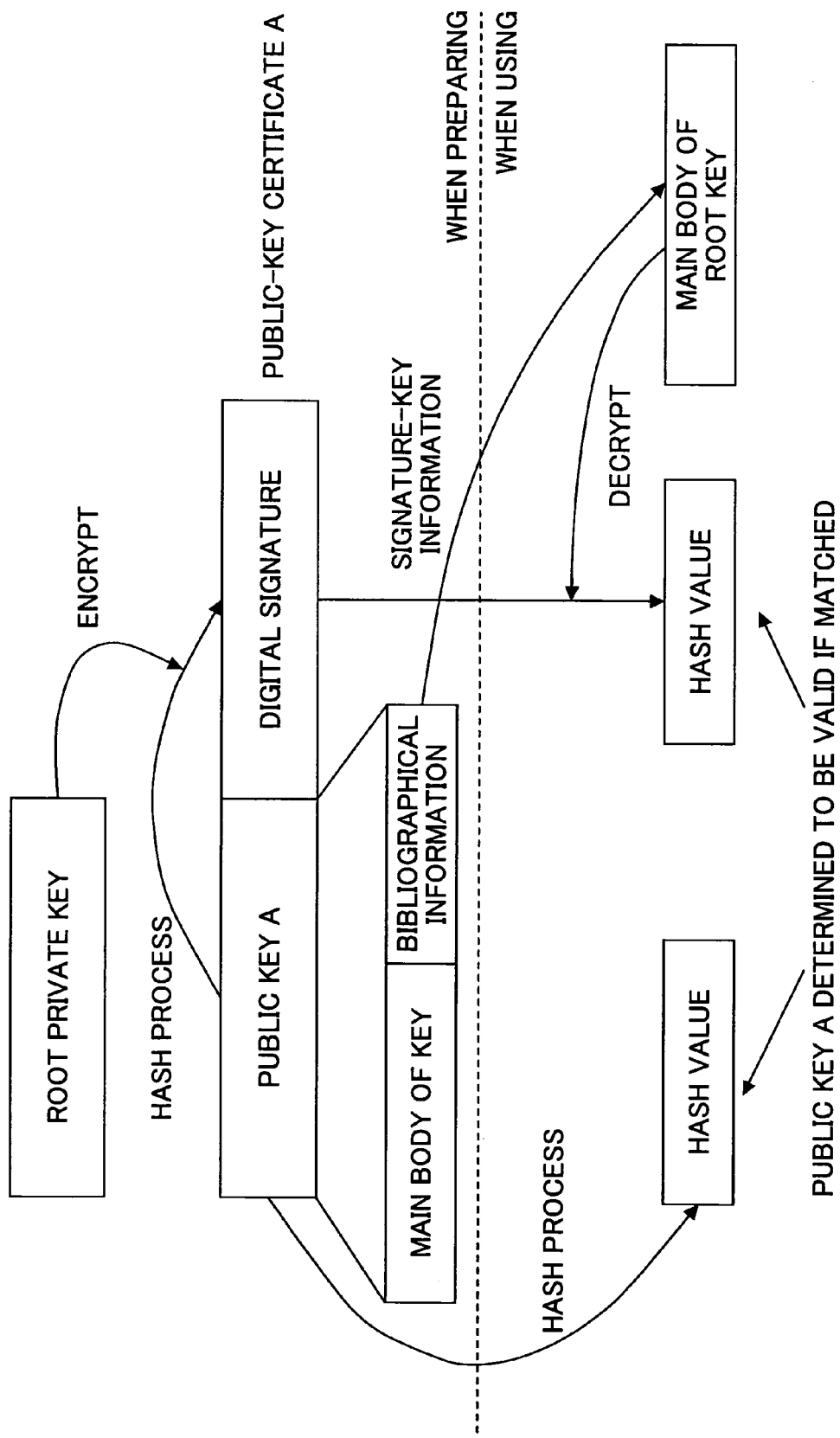

METHOD OF NULLIFYING DIGITAL CERTIFICATE, APPARATUS FOR NULLIFYING DIGITAL CERTIFICATE, AND SYSTEM, PROGRAM, AND RECORING MEDIUM FOR NULLIFYING DIGITAL CERTIFICATE

TECHNICAL FIELD

The present invention generally relates to a technology for a digital certificate, and more particularly to a method of nullifying by a communications apparatus a digital certificate for use in authentication process by a communications counterpart of the communications apparatus, an apparatus for nullifying the digital certificate for use in authentication process by the communications counterpart, a system for nullifying the digital certificate comprising the digital-certificate nullifying apparatus and the communications apparatus to be its communications counterpart as described above, a program for causing a computer to function as the digital-certificate nullifying apparatus as described above, and a computer-readable recording medium having recorded such a program.

BACKGROUND ART

Conventionally, connecting multiple communications apparatuses, each having its own communications function, via a network for communicating, and building various systems are performed. As an example, there is a so-called electronic-commerce system such that an order for a product is transmitted from a computer such as a PC (Personal Computer) that functions as a client apparatus and accepts the order in a server apparatus that communicates with the client apparatus via the Internet. Moreover, a system is being proposed such that various electronic apparatuses are provided with a function of a client apparatus or a server apparatus so as to be connected via an network, and are remotely controlled by mutual communications.

In building such systems, it is important to confirm when communicating whether a communications counterpart is appropriate, or whether information being transmitted has not been tampered with. Moreover, especially in the Internet, as often information goes through computers that are unrelated before reaching the communications counterpart, when transmitting secret information, there is also a demand for making sure that the contents are not viewed secretly. Then, a protocol such as SSL (Secure Sockets Layer), for example, as a communications protocol to respond to such demand is being developed and widely used. Using this protocol to communicate combines public-key encrypting methods and common-key encrypting methods for authenticating the communications counterpart as well as preventing tampering and tapping by encrypting information. Moreover, even at the communications-counterpart side, a communications-originating apparatus that requests for communications is authenticated.

As technologies related to authentication using such SSL and public-key encrypting, there are those described in Patent Documents 1 and 2:

Patent Document 1

JP2002-353959A

Patent Document 2

JP2002-251492A

Now, a communications procedure for mutually authenticating according to this SSL is described focusing on the authentication process portion. FIG. 27 is a diagram illustrating a flow of a process of executing in each apparatus when communications apparatuses A and B mutually authenticate according to the SSL, along with information used for the process.

As illustrated in FIG. 27, when mutually authenticating according to the SSL, there is a need to first have a root-key certificate, a private key, and a public-key certificate stored in both of the communications apparatuses. This private key is a private key issued to each apparatus by a CA (Certificate Authority), while the public-key certificate is one such that the public key corresponding to the private key is appended with a digital signature by the CA so as to be set as a digital certificate. Moreover, the root-key certificate is one such that a root key corresponding to a root-private key used in the digital signature is appended with a digital signature so as to be set as a digital certificate.

FIGS. 28A and 28B illustrate these relationships.

As illustrated in FIG. 28A, a public key A is configured from a main body of the key for decrypting text encrypted using a private key A, and bibliographical information which includes such information as issuer (CA) of the public key and validity. Then, in order to indicate that the main body of the key and the bibliographical information are not tampered with, a hash value obtained by hashing the public key A is encrypted using a root-private key so as to be applied to a client common key as a digital signature. Moreover, at that time, information identifying the root-private key used in the digital signature is added as signature-key information to the bibliographical information of the public key A. Then, the public-key certificate having this digital signature applied is a common-key certificate A.

When using this common-key certificate A for authenticating, the digital signature contained therein is decrypted using a main body of a root key being a public key corresponding to the root-private key. It is understood when this decrypting is performed successfully that the digital signature is certainly applied by the CA. Moreover, it is understood when the hash value obtained by hashing the public key A portion and a hash value obtained by decrypting matches that the key itself is also neither damaged nor tampered with. Furthermore, it is understood when it is possible to successfully decrypt the received data using this public key A that the data is transmitted from the owner of the private key A.

Now, while it is necessary to store in advance a root key for performing authentication, as illustrated in FIG. 28B, this root key is stored as a root-key certificate having applied a digital signature by the CA. This root-key certificate is in a self-signature format enabled to decrypt the digital signature with a public key contained therein. Then, when using the root key, the main body of the key contained in the root-key certificate is used to decrypt the digital signature so as to compare with the hash value obtained by hashing the root key. When there is a match, it is possible to confirm that the root key is not corrupted, for instance.

Now the flowcharts in FIG. 27 are described. It is noted that in this diagram, an arrow between the two flow charts represents transferring of data such that the transmitting side performs a transferring process at a step from which the arrow originates, while the receiving side once the information is received performs a process of a step to which the arrow points. Moreover, when a process of each of the steps is not successfully completed, at that time a response of having failed authentication is returned so as to suspend the process. The same holds when a response of having failed authentication is received from the counterpart, or upon time-out of the process.

Now, with a communications apparatus A requesting for communications with a communications apparatus B, when performing this request, the CPU of the communications apparatus A executing a required control program starts a process of the flowchart illustrated on the left-hand side of FIG. 27. Then, in step S11, a request for connection is transmitted to the communications apparatus B.

On the other hand, the CPU of the communications apparatus B once receiving this request for connection executing a required control program starts a process of the flowchart illustrated on the right-hand side of FIG. 27. Then, in step S21 a first random number is generated for encrypting using a private key B. Then, in step S22, the encrypted first random number and a public-key certificate B are transmitted to the communications apparatus A.

At the communications apparatus A side, when receiving this, in step S12 the validity of the public-key certificate B is confirmed using a root-key certificate.

Then once confirmed, in step S13 the first random number is decrypted using a public key B contained in the received public-key certificate B. When the decrypting here is successful, confirming that the first random number is certainly received from a subject to which the public-key certificate is issued is enabled. Then, when the confirming as described above is enabled, information indicating success of authentication is transmitted to the communications apparatus B.

Moreover, at the communications apparatus B side, upon receiving this information, in step S23, transmission of a public-key certificate for authentication is requested to the communications apparatus A.

Then, at the communications apparatus A, based on the above request for transmission, in step S14, a second random number and a common-key seed are generated. A common-key seed may be generated based on data transacted in previous communications, for example. Then, in step S15 the second random number is encrypted using a private key A, the common-key seed is encrypted using the public key B, and in step S16 these are transmitted with a public-key certificate A to the server apparatus. Encrypting the common-key seed is performed for the purpose of making sure that the common-key seed is not known to apparatuses other than the communications counterpart.

Then, in the next step S17, a common key for use in encrypting subsequent communications is generated from the common-key seed generated in step S14.

At the communications apparatus B side, when receiving this, in step S24 the validity of the public-key certificate A is confirmed using the root-key certificate. Then once confirmed, in step S25, the second random number is decrypted using a public key A contained in the public-key certificate A received. When the decrypting here is successful, confirming that the second random number is certainly received from a subject to which the public-key certificate A is issued is enabled.

Subsequently, in step S26 the common-key seed is decrypted using a private key B. It can be said that, in the process thus far, the common-key seed common to the communications apparatus A side and the communications apparatus B side are shared. Then, the common-key seed does not become known to apparatuses other than the communications apparatus A having generated the seed and the communications apparatus B having the private key B. Once the process described thus far succeeds, also at the communications apparatus B side in step S27 a common key for use in encrypting subsequent communications is generated from the common-key seed obtained by decrypting.

Then, once the process of step S17 at the communications apparatus A side and the process of step S27 at the communications apparatus B side are terminated, success of authentication and encrypting method for use in subsequent communications are mutually confirmed for terminating the process regarding authentication assuming that the generated common key is used to conduct the subsequent communications using the encrypting method confirmed as described above. It is noted that the confirming as described above includes a response from the communications apparatus B that authentication has succeeded. The process as described above enables mutually establishing communications so as to subsequently use the common key generated in step S17 or S27 and to encrypt data according to the common-key encrypting method for conducting communications.

Performing such process as described above enables securely sharing a common key upon the communications apparatus A and communications apparatus B mutually authenticating their counterparts, and establishing a path for communicating securely.

It is noted that in the process as described above, it is not mandatory to encrypt the second random number with the private key A and to transmit the public-key certificate A to the communications apparatus B. In this way, while it is not possible for the communications apparatus B to authenticate the communications apparatus A, this process is sufficient when it suffices for the communications apparatus A to only authenticate the communications apparatus B. Then in this case, it is necessary to have only the root-key certificate stored in the communications apparatus A so that neither the private key A nor the public-key certificate A are needed. Moreover, it is not necessary to have the root-key certificate stored in the communications apparatus B.

Now, when using such authentication process for identifying a subject for providing a service such as remote control, a certificate, etc., required for authentication process is to be stored in a subject apparatus for providing the service (an apparatus at the user side). Then, an apparatus providing the service, based on information provided in the certificate, etc., determining whether a communications counterpart is an apparatus suitable as a subject for providing the service is performed. Moreover, if the information provided in the certificate, etc. is not sufficient, obtaining an equipment-number information for use in the determining as described above, after establishing a communications path, is performed.

Moreover, a certain apparatus being a subject for providing the service for a predetermined period may no longer be a subject for providing the service upon dissolving an agreement. In such a case, nullifying a certificate of the apparatus which is no longer a subject for providing the service is required.

As a technologies related to such nullifying, technologies as described in Patent Documents 3 and 4 are known.

Then, in the Patent Document 3, a technology is described in which an Issuing Authority (IA) for providing an authentication service such as a public-key registration based on a request from a Registration Authority (RA), upon receiving from the RA as described above a request for nullifying a public-key certificate of the RA itself, retrieves a public-key certificate of an user that is registered from the RA so as to nullify the public-key certificate of the user. Moreover, in Patent Document 4, a technology is described in which a pubic-key authentication apparatus analyzes a request for nullifying a public-key certificate that is received from an attribute-authentication apparatus to extract a public-key certificate to be nullified so as to nullify the extracted public-key certificate in a database.

Patent Document 3

JP2002-247028A

Patent Document 4

JP2002-058049A

However, with the techniques as described in these Patent Documents 3 and 4, nullifying of the public-key certificate of the user is provided for performing only at the side managing the certificate, or the side providing the service. In other words, a process of deleting user information and certificate identification number regarding the public-key certificate for nullifying is provided for so that while the fact that the public-key certificate is nullified is communicated to the user, no action is performed on the public-key certificate, etc. which has been stored in the apparatus at the user side so as to leave the public-key certificate, etc. as it is.

Therefore, in the apparatus at the user side, the common-key certificate at the time of being provided the service remains to be stored. Therefore, there was a problem such that there is the potential that a certificate or a key may leak out, get copied, or be abused. Such item as the certificate is being set up as a nullified one at the service provider side. However, it is not preferable for these items to leak out unlimitedly as the certificate itself is within its validity period and is no different from a valid certificate or key from in terms of the respective forms unless there are particular circumstances such as having dissolved an agreement in tandem with expiration of the validity period.

Moreover, there was a problem such that as the apparatus at the user side is still in a state of being able to attempt accessing an apparatus at the service providing side, a process load arises with the apparatus at the service providing side to determine that this access is out of scope of providing the service so as to reject communicating. This kind of process load becomes greater when the user-side apparatus has a function of automatically accessing the service providing side once every certain time period. As a method of reducing this process load, while a CRL (a Certificate Revocation List) may be registered so as to make impossible communications according to the SSL with the out-of-scope apparatus, even such method does not completely eliminate the process load as, long as there is an access.

Then, as it is not desirable to spare processing power for dealing with apparatuses which are out of scope for providing the service, there was a demand for reducing such process load as much as possible.

DISCLOSURE OF THE INVENTION

Accordingly, it is a general object of the present invention to provide a technology for a digital certificate that substantially obviates one or more problems caused by the limitations and disadvantages of the related art.

It is a more particular object of the present invention to provide, in a communications system comprising a communications apparatus for authenticating using a digital certificate a communications counterpart, a method of nullifying digital certificates that enables preventing a normal digital certificate or key from leaking out as well as decreasing a process load for the communications apparatus to dealing with an unsuitable communications counterpart.

According to the invention, a method of nullifying digital certificates for nullifying, by means of a communications apparatus, a digital certificate for use by a communications counterpart of the communications apparatus in authenticating includes the step of: causing the communications apparatus to transfer to the communications counterpart, when determining based on a normal certificate being a valid digital certificate received from the communications counterpart or information received via a communications path based on the normal certificate that the normal certificate is to be nullified, a certificate for nullifying being a digital certificate for nullifying.

The method of nullifying digital certificates in an embodiment of the invention enables preventing a normal digital certificate or key from leaking out as well as decreasing a process load for the communications apparatus to dealing with an unsuitable communications counterpart.

According to another aspect of the invention, an apparatus for nullifying digital certificates for nullifying a digital certificate for use by a communications counterpart in authenticating includes: means for receiving a normal certificate being a valid digital certificate from the communications counterpart; and means for transferring to the communications counterpart, when determining based on the received normal certificate or information received via a communications path based on the normal certificate that the normal certificate is to be nullified, a certificate for nullifying being a digital certificate for nullifying.

The apparatus for nullifying digital certificates in an embodiment of the invention enables preventing a normal digital certificate or key from leaking out as well as decreasing a process load for the communications apparatus to dealing with an unsuitable communications counterpart.

According to yet another aspect of the invention, a system for nullifying digital certificates comprising an apparatus for nullifying digital certificates for nullifying a digital certificate for use by a communications counterpart in authenticating and a communications apparatus to be a communications counterpart of the apparatus for nullifying digital certificates, wherein the apparatus for nullifying digital certificates includes means for receiving a normal certificate being a valid digital certificate from the communications counterpart; and means for transferring to the communications counterpart, when determining based on the received normal certificate or information received via a communications path based on the normal certificate that the normal certificate is to be nullified, a certificate for nullifying being a digital certificate for nullifying, and wherein the communications apparatus includes means for, when receiving the certificate for nullifying from the apparatus for nullifying digital certificate, overwriting the normal certificate being stored with the received certificate for nullifying.

The system for nullifying digital certificates in an embodiment of the invention enables preventing a normal digital certificate or key from leaking out as well as decreasing a process load for the communications apparatus to dealing with an unsuitable communications counterpart.

BRIEF DESCRIPTION OF THE DRAWINGS

Other objects, features, and advantages of the present invention will become more apparent from the following detailed description when read in conjunction with the accompanying drawings, in which:

FIG. 5 is a diagram for describing an exemplary format of a public-key certificate;

FIG. 6 is a diagram illustrating an exemplary normal public-key certificate for the lower apparatus according to the format described in FIG. 5;

FIG. 7 is an diagram illustrating an exemplary set of data for transferring from the upper apparatus to the lower apparatus illustrated in FIG. 1;

FIG. 8 is a diagram illustrating the state of storage with a communications destination when communicating using a public-key certificate set and its certificate for communicating with the upper apparatus in a certificate storage of the lower apparatus as illustrated in FIG. 1;

FIG. 16 is a table illustrating an exemplary setting of a flag for nullifying a certificate in the upper apparatus as illustrated in FIG. 1;

FIG. 21 is a table illustrating an exemplary updating-condition table to be stored in the upper apparatus as illustrated in FIGS. 1 and 3;

FIG. 22 is another table illustrating an exemplary equipment-information table to be stored in the upper apparatus as illustrated in FIGS. 1 and 3;

FIGS. 28A and 28B are diagrams for describing relationships among a root key, a root-private key, and a public-key certificate in the authenticating process as illustrated in FIG. 27.

BEST MODE FOR CARRYING OUT THE INVENTION

Descriptions are given next, with reference to the accompanying drawings, of embodiments of the present invention.

Below, a communications apparatus for executing a process regarding a method of nullifying the digital certificates according to the present invention, and a configuration of an embodiment of a communications system of the present invention that is configured using the apparatus are described.

Figure 1:
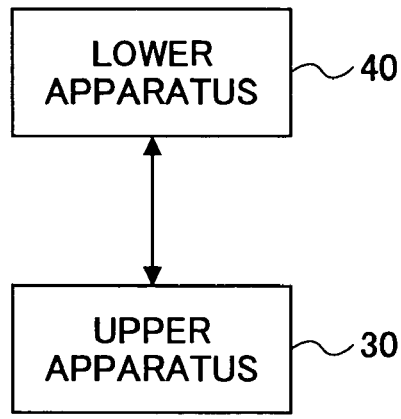
FIG. 1 is a block diagram illustrating an exemplary configuration of a communications system for executing a method of nullifying certificates of the present invention.

Now in FIG. 1 the configuration of the communications system is illustrated.

In this communications system, as illustrated in FIG. 1, an upper apparatus 30 being the communications apparatus for executing the process regarding the method of nullifying the digital certificate and an apparatus for nullifying digital certificates, and a lower apparatus 40 being a communications apparatus to be its communications counterpart configures the communications system.

Then, the upper apparatus 30, when trying to communicate with the lower apparatus 40, is provided for establishing communications with the lower apparatus 40 when the lower apparatus 40 is authenticated as a valid communications counterpart with authentication according to a SSL protocol being a method of authenticating using a public-key cipher and a digital certificate. Moreover, the lower apparatus 40 performs a necessary process so as to return a response to a request for operating (a command) that is transmitted by the upper apparatus 30, for functioning as a client-server system.

Conversely, the lower apparatus 40, when trying to communicate with the upper apparatus 30, is provided for establishing communications with the upper apparatus 30 when the upper apparatus 30 is authenticated as a valid communications counterpart with authentication according to the SSL protocol. Then, the upper apparatus 30 performs a necessary process so as to return a response to a request for operating (a command) transmitted by the lower apparatus 40, for functioning as a client-server system.

In either of the above cases, the side requesting communications is to function as a client, while the side being requested to communicate is to function as a server.

Figure 17:
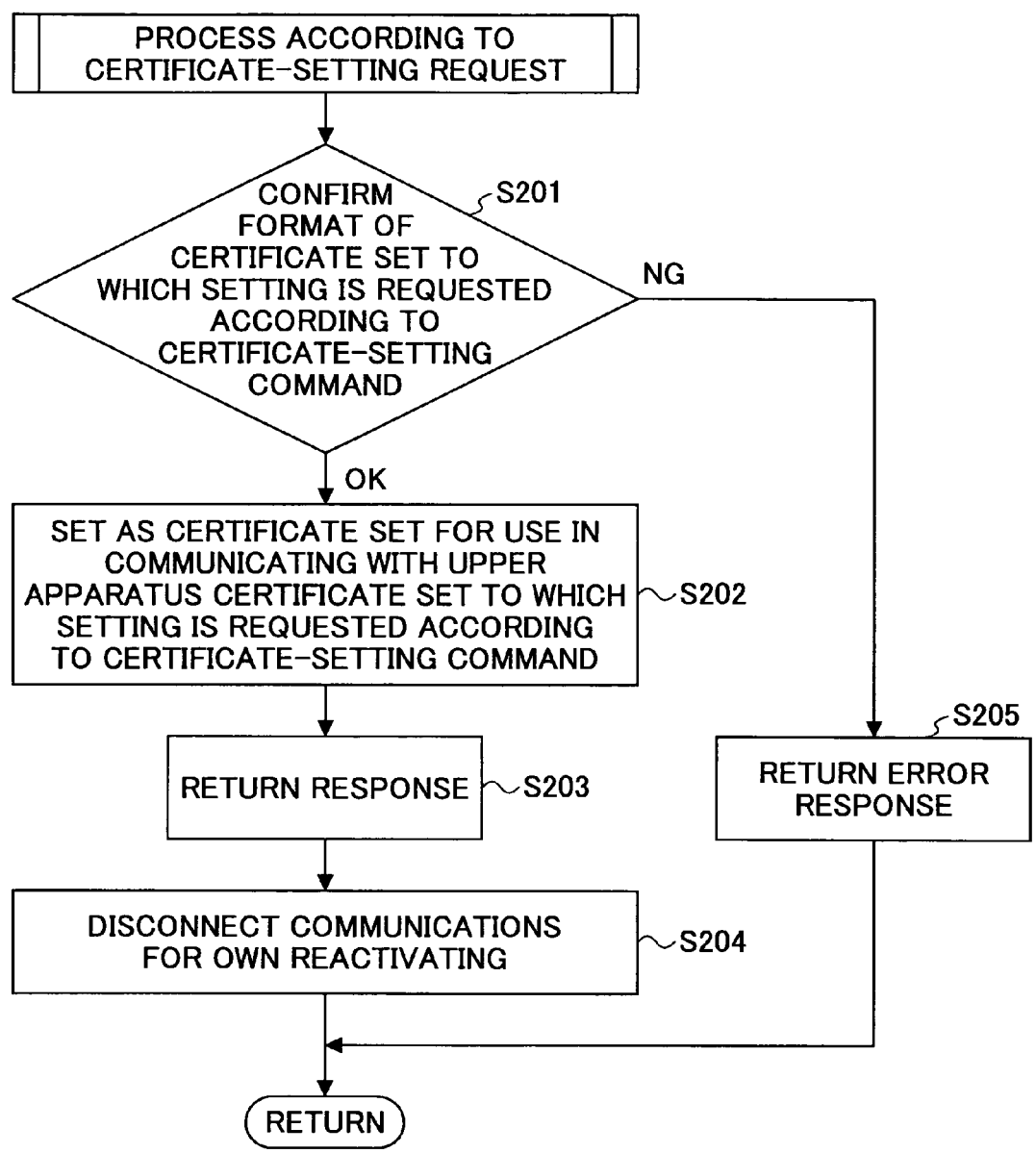
FIG. 17 is a flowchart illustrating a process of executing when the lower apparatus as illustrated in FIG. 1 receives from the upper apparatus a command for setting a certificate.
Figure 18:
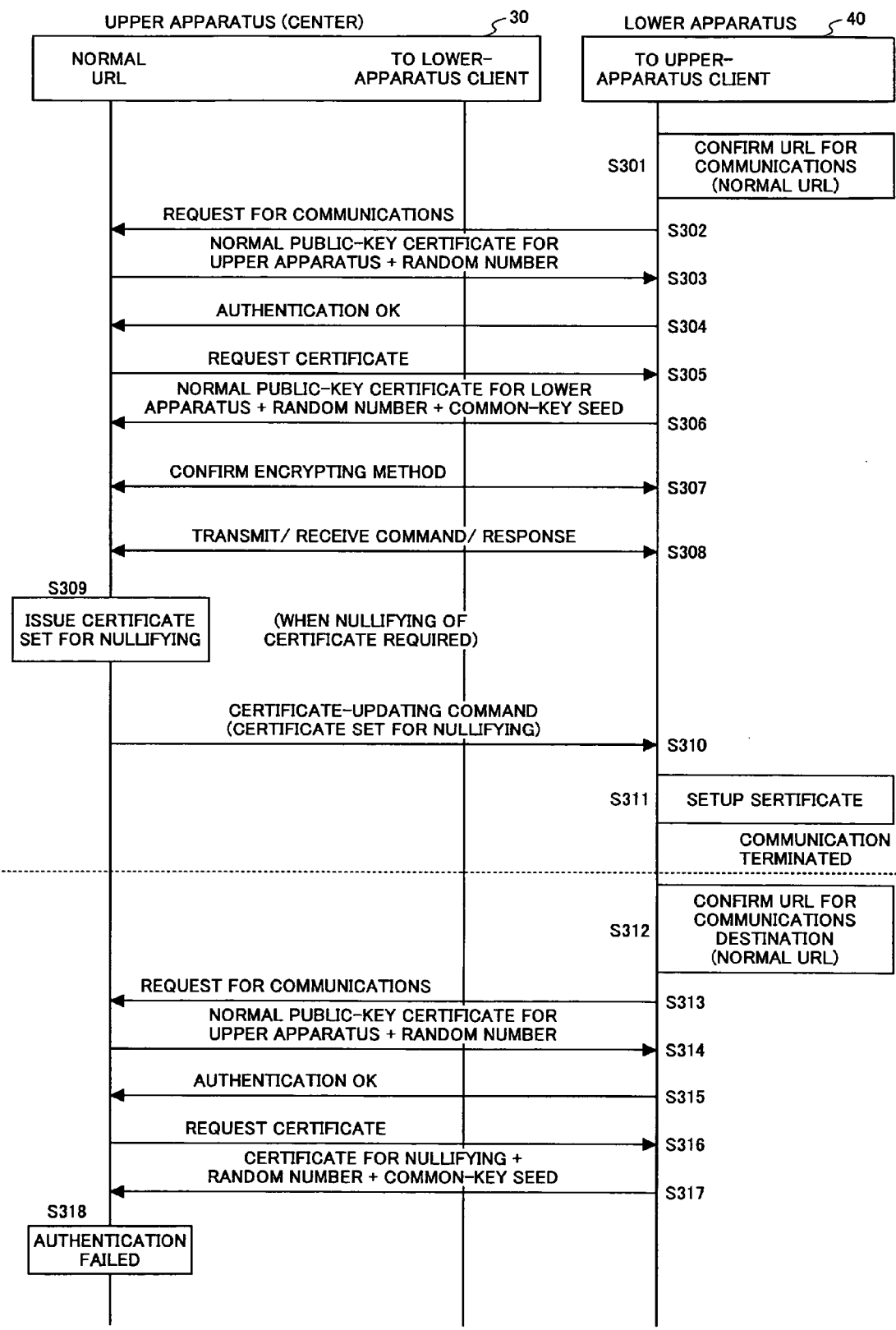
FIG. 18 is a sequence diagram illustrating an exemplary process sequence when the upper apparatus and the lower apparatus execute a process of nullifying authentication information as illustrated in FIGS. 15 and 17.

It is noted that, in FIG. 1, while only one lower apparatus 40 is illustrated, as illustrated in FIG. 17, it is possible to provide multiple lower apparatuses 40. Furthermore, there is one upper apparatus 30 for one communications system.

In such a communications system as described above, including the communications as described above, each node to be the upper apparatus 30 and the lower apparatus 40 transmits "a request" for a process to a method of an application program being mutually implemented so as to obtain "a response" as a result of the requested process according to a RPC (a Remote Procedure Call).

In order to implement the RPC, known protocols (communications rules), technologies, and specifications, etc. such as SOAP (Simple Object Access Protocol), HTTP (Hyper Text Transfer Protocol), FTP (File Transfer Protocol), COM (Component Object Model), CORBA (Common Object Request Broker Architecture), etc. may be used.

Next, configurations and functions of each apparatus illustrated in FIG. 1 are described in greater detail.

Figure 2:
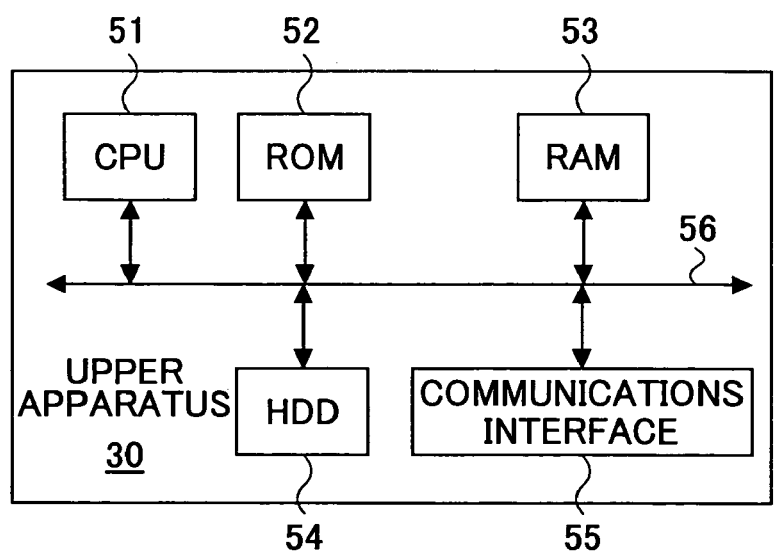
FIG. 2 is a block diagram illustrating a hardware configuration of an upper apparatus illustrated in FIG. 1.

FIG. 2 is a block diagram illustrating a hardware configuration of the upper apparatus 30. As illustrated, the upper apparatus 30 comprises a CPU 51, a ROM 52, a RAM 53, a HDD 54, and a communications interface 55, which are connected via a system bus 56. Then, the CPU 51 executes various control programs stored in the ROM 52 and the HDD 54 for controlling an operation of this upper apparatus 30 and implementing such functions as communicating, authenticating, and nullifying the digital certificate.

It is noted that as a piece of hardware of the upper apparatus 30 a known computer may be adopted as appropriate. Of course, as needed another piece of hardware may be added.

Moreover, as more specific hardware configurations, including the lower apparatus 40, various configurations may be taken depending on such objectives as remote apparatus control and electronic commerce. For instance, in the case of remote control, an electronic apparatus such as a printer, a facsimile apparatus, a copying machine, a scanner, an image-processing apparatus such as digital multi-functional equipment, as well as a piece of networked consumer-electronic equipment, an automated vending-machine, a piece of medical equipment, a power-supply apparatus, an air-conditioning system, a system for measuring gas, water, and electricity, etc., an automobile, and an aircraft may be set as a lower apparatus 40 being an apparatus to be controlled, while a control apparatus for gathering information from these apparatuses to be controlled, and sending a command so as to cause these apparatuses to be controlled to operate may be set as an upper apparatus 30. It is noted that regardless of the configuration the upper apparatus 30 is to have a function of transferring a digital certificate for nullifying or communications-destination information to the lower apparatus 40 as described below.

Moreover, each of the upper apparatus 30 and the lower apparatus 40 is to comprise at least a CPU, a ROM, a RAM, a communications interface for communicating with an external apparatus via a network, and storage means for storing information necessary for authentication, so that the CPU executing a required control program stored in the ROM, etc. causes the respective apparatuses to implement each function in the present invention.

It is noted that, for this communication, various communication lines (communication paths) for building a network, wired or wireless, may be adopted.

Figure 3:
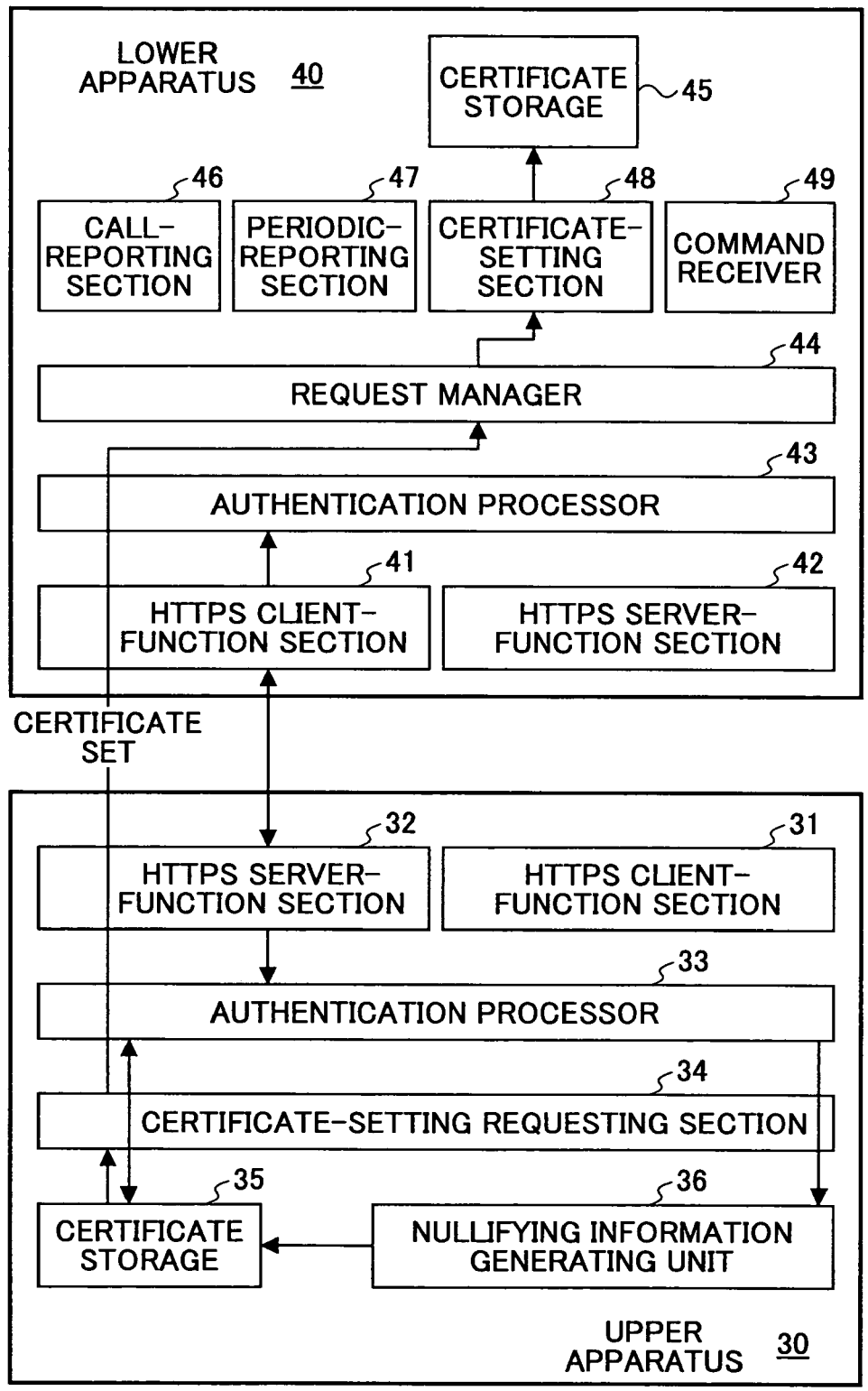
FIG. 3 is a functional block diagram illustrating a functional configuration of portions related to the present invention, for an upper apparatus and a lower apparatus illustrated in FIG. 1.

Now, in FIG. 3 is illustrated a functional block diagram of portions related to the present invention, for the upper apparatus 30 and the lower apparatus 40. In this diagram, illustrations of those portions not related to the present invention are omitted.

First the upper apparatus 30 comprises a HTTPS (Hypertext Transfer Protocol Secure) client-function section 31, a HTTPS server-function section 32, an authentication processor 33, a certificate-setting request section 34, a certificate storage 35, and an nullifying-information generating section 36.

The HTTPS client-function section 31 has a function of using a HTTPS protocol including authenticating and encrypting according to the SSL so as to request for communications to an apparatus having a function of a HTTPS server, such as the lower apparatus 40.

On the other hand, the HTTPS server-function section 32 has a function of accepting a request for communications using the HTTPS protocol from the apparatus having the HTTPS client function.

Then, these HTTPS client-function section 31 and HTTPS server-function section 32 implement a function of transmitting a command and a data item to the communications counterpart so as to cause operations depending on the command and the data item to be implemented, and a function of receiving a command and a data item from the communications counterpart so as to cause each portion of the apparatus to execute operations depending on the command and the data item for returning the result as a response to the requestor. In this case, the side requesting the communications may transmit a command, or the side accepting the request may transmit the command. The same holds for responses.

The authentication processor 33 functions as authenticating means for authenticating using a digital certificate received from the communications counterpart and various certificates and private key, etc., being stored in the certificate storage 35 when the HTTPS client-function section 31 or the HTTPS server-function section 32 authenticates the communications counterpart. Moreover, it has a function of transmitting to the communications counterpart a digital certificate being stored in the certificate storage 35 via the HTTPS client-function section 31 and the HTTPS server-function section 32 in order to request an authentication from the communications counterpart.

The certificate-setting request section 34 functions as certificate-transferring means for transferring in a predetermined case as described below a required certificate, etc., and functions as certificate-setting means for requesting, when performing the transferring, the apparatus to be transferred to, to set the required certificate set, etc.

The certificate storage 35 has a function of storing information for authenticating various certificates and private key, etc., to provide for authenticating in the authentication processor 33. The information for authenticating to be stored as described above includes authentication information for nullifying and communications-destination information that are described below.

The nullifying-information generating section 36 has a function of generating nullifying information such as a certificate for nullifying and communications-destination information for nullifying, for use in nullifying authentication information for use when the lower apparatus 40 communicates with the upper apparatus 30. The generated nullifying information may be provided for immediately transferring to the lower apparatus 40 by the certificate-setting request section 34, or may be stored in the certificate storage 35 for transferring to the lower apparatus 40 as needed. Moreover, it is possible for the nullifying-information generating section 36 rather than generating the nullifying information itself communicates with an external CA, etc. for obtaining the information therefrom.

Then, the functions of each of the sections as described above are implemented by the CPU of the upper apparatus 30 executing a required control program so as to control operations of each portion of the upper apparatus 30.

Next, the lower apparatus 40 comprises a HTTPS client-function section 41, a HTTPS server-function section 42, an authentication processor 43, a request manager 44, a certificate storage 45, a call-reporting section 46, a periodic-reporting section 47, a certificate-setting section 48, and a command receiver 49.

The HTTPS client-function section 41, the same as the HTTPS client-function section 31 of the upper apparatus 30, has a function of using the HTTPS protocol to request communications with the apparatus having the function of the HTTPS server such as the upper apparatus 30 as well as transmitting/receiving a command and a response to the command.

The HTTPS server-function section 42, again, being the same as the HTTPS server-function section 32 of the upper apparatus 30, has a function of accepting a request for communications from the apparatus having the HTTPS client function as well as transmitting/receiving a command and a response to and from the command.

While a function of the authentication processor 43, again, is the same as that of the authentication processor 33 of the upper apparatus 30, the certificate, etc., for use in authenticating are those being stored in the certificate storage 45.

The request manager 44 has a function of determining, for the command received from the upper apparatus, whether to execute operations based on the command. Then, it also has a function of, when accepting executing, passing on the command to the function sections 46 through 49 for executing operations based on the command.

The certificate storage 45 functions as certificate-storage means for storing authentication information such as various certificates and private keys, etc., the same as the certificate storage 35 of the upper apparatus, so as to provide for authenticating in the authentication processor 43. It is noted that the certificates, etc., being stored are, as described below, different from those of the certificate storage 35.

The call-reporting section 46 has a function of performing a call for reporting to the upper apparatus 30 when an abnormality is detected or when there is an instruction from a user.

The periodic-reporting section 47 has a function of reporting periodically from the lower apparatus 40 to the upper apparatus 30. The contents of the reporting may be, for example in a case of an image-forming apparatus, a value of a counter for counting the number of images formed, and in a case of a measuring system the measured value thereof, etc.

The certificate-setting section 48 has a function of setting at the certificate storage 45 the certificate, etc., received from the upper apparatus 30 for use in authenticating, and updating the certificate, etc.

The command receiver 49 has a function of executing an operation corresponding to a request for a function other than functions of the function sections 46 through 48 as described above. The operation may be to transmit data being stored in the lower apparatus 40 or to control as needed an operation of an engine (the illustration being omitted).

Then, the function of each of these sections is implemented by the CPU of the lower apparatus 40 executing a required control program so as to control the operation of each section of the lower apparatus 40.

Figure 4A:
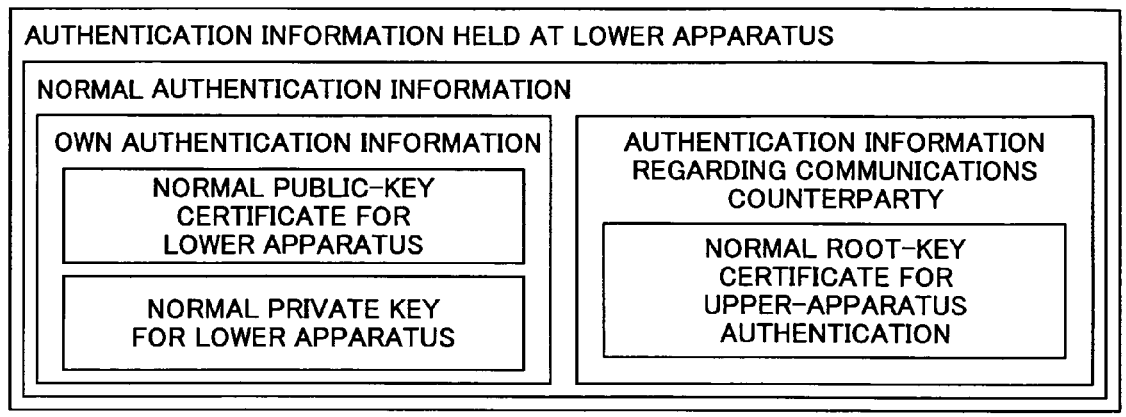
FIG. 4A is a diagram for describing authentication information being stored in the upper apparatus illustrated in FIG. 1.
Figure 4B:
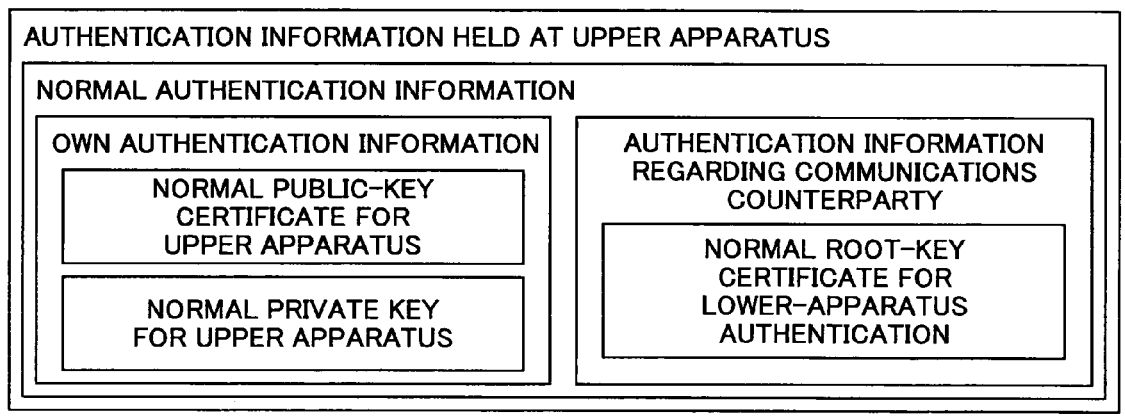
FIG. 4B is a diagram for describing authentication information being stored in the lower apparatus illustrated in FIG. 1.

Next, the characteristics and the usage of each of the certificates and keys used in authenticating by the apparatuses as described above are described. FIG. 4A is a diagram illustrating the types of certificates and keys being stored in the certificate storage 45 of the lower apparatus 40, while FIG. 4B is a diagram illustrating the types of certificates and keys being stored in the certificate storage 35 of the upper apparatus 30.

As illustrated, the upper apparatus 30 and the lower apparatus 40 have stored therein as normal authentication information a public-key certificate and a private key that are authentication information regarding own apparatus, and a root-key certificate being authentication information regarding the communications counterpart.

Figure 27:
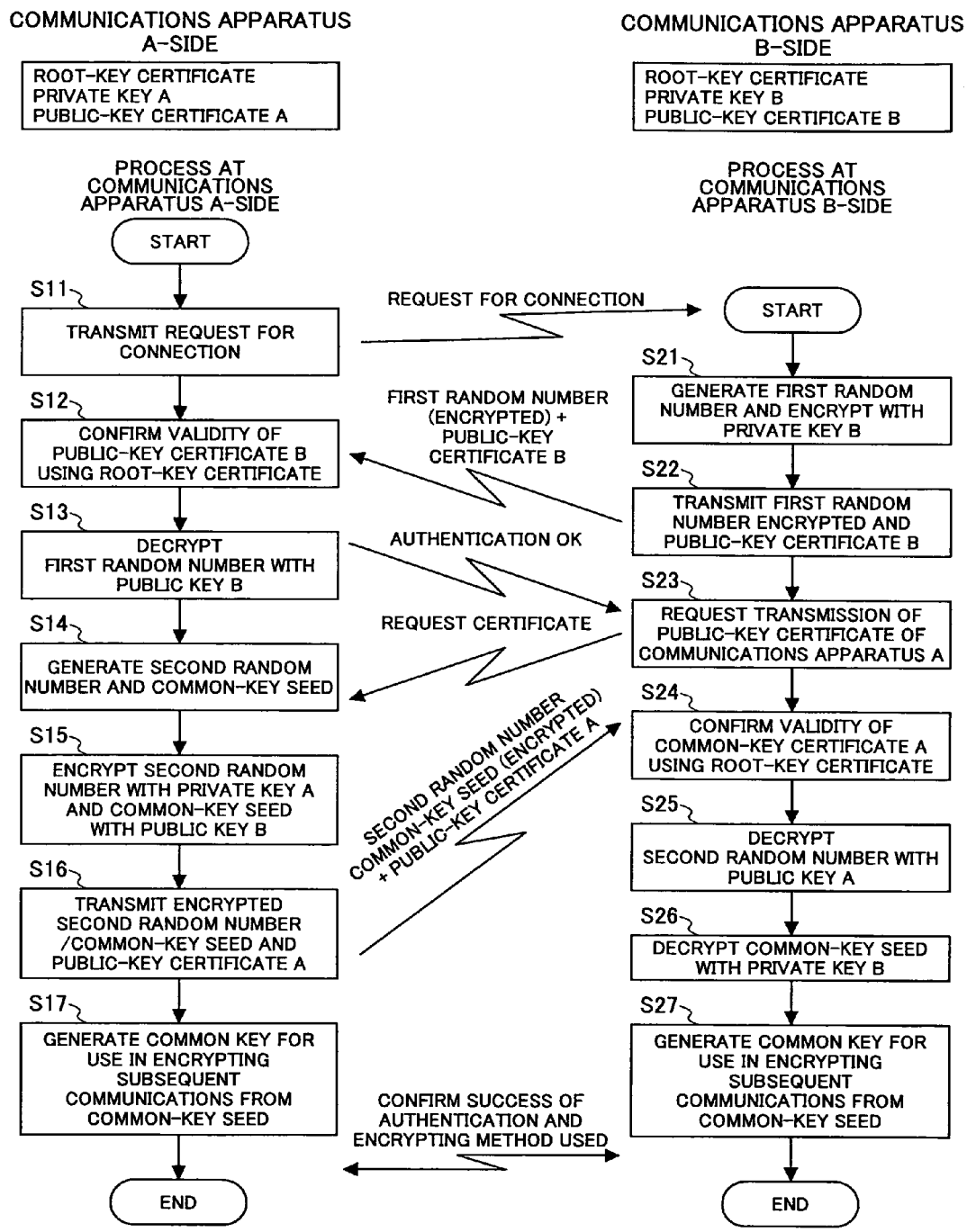
FIG. 27 is a diagram illustrating a flow of a process for executing in each apparatus when two communications apparatuses mutually authenticate according to SSL, as well as information for use in the process.

Then, each apparatus, when conducting normal communications, uses these authentication-information items so as to perform according to the SSL the authentication procedure as described using FIG. 27.

Figure 29:
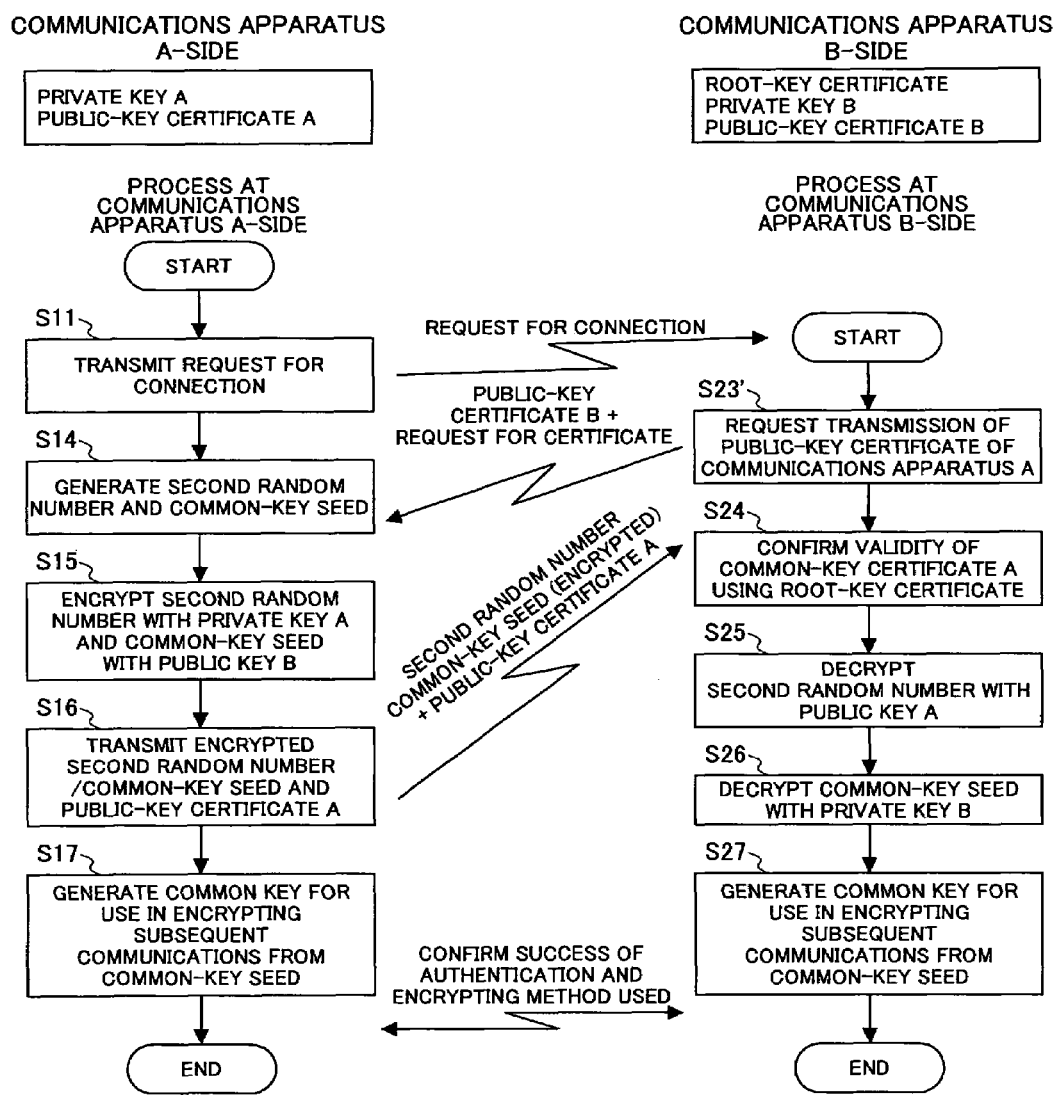
FIG. 29 is a diagram illustrating a variant of the authentication process illustrated in FIG. 27 as well as information for use in the process.

Moreover, though different from the normal SSL, it is possible to perform an authentication process having omitted a procedure of encrypting a first random number with a private key B for transmitting the encrypted number with a public-key certificate B to a communications apparatus A. The process in this case being as illustrated in FIG. 29, when compared with the process as illustrated in FIG. 27, does not require the process of steps S21 and S22 at the communications apparatus B side and the process of steps S12 and S13 at the side of the communications apparatus A (the apparatus functioning as the client). In this way, while the communications apparatus A cannot authenticate the communications apparatus B (the apparatus functioning as the server), this process suffices when only the communications apparatus B authenticating the communications apparatus A is needed. Then, in this case, there is no need to have the communications apparatus A store a root-key certificate. It is noted that as a public key B and a private key B are used for securely transmitting a common-key seed from the communications apparatus A to the communications apparatus B, while not for use in authentication, these keys are to be stored in the communications apparatus B.

Furthermore, out of the certificates and keys illustrated in FIGS. 4A and 4B, a normal public-key certificate for the lower apparatus is a digital certificate having applied to a normal public key issued by a CA (not illustrated) to the lower apparatus 40, a digital signature enabled to confirm its validity using a normal root key for authenticating the lower apparatus.

Now, the public-key certificate, for which one illustrated in FIG. 5 may be used as an example, describes the public key itself as well as information on the issuer of the certificate, the validity period of the certificate, the subject to be certified (an apparatus or a user of the issuer of the certificate), etc. More specifically, the certificate may be prepared according to a format referred to as X. 509 that is used as the format for an exemplary explanation below, so that the normal public-key certificate for the lower apparatus that is prepared according to the format becomes one such as illustrated in FIG. 6, for example. (It is noted that herein an item is to be called the format, while the contents of the item are to be called the contents in the exemplary explanation below.)

In this example, A represents information identifying a CA, while C represents information identifying an apparatus being the subject of the certificate. These include information such as location, name, ID, or code. It is noted that, for the subject apparatus, it is not mandatory to describe identifying information, which would enable identifying individual apparatuses, such as ID. Moreover, B represents the validity period with the starting date/time and the ending date/time specifying the validity period.

Moreover, in this example, the contents prior to ":", that represent information items, e.g. "Serial Number" or "Subject" correspond to the format. Moreover, the contents before "=", representing further detailed items such as "C" or "ST" being prepared below "Issuer" or "Subject" also correspond to the format. Then, the contents of each item such as "101 (0×0)" for "Serial Number" corresponds to the contents. It is noted that there may be portions such as a remark corresponding to neither the format nor the contents. Conversely, there may be portions corresponding at the same time to both the format and the contents.

Furthermore, the normal private key for the lower apparatus is a private key corresponding to the normal public key as described above, while the normal root-key certificate for authenticating the lower apparatus is a digital certificate applying to a normal root key for authenticating the lower apparatus using a root-private key corresponding to itself a digital signature able to confirm itself the validity.

It is noted that even when having provided multiple lower apparatuses 40, the digital signatures applied to the normal public key of each apparatus are applied using the same root-private key and the normal root-key certificates required for confirming the validity set to be common. However, the normal public-key included in the normal public-key certificate and its corresponding private key differ from apparatus to apparatus.

The same relationship holds for the normal public-key certificate for the upper apparatus, the normal private key for the upper apparatus, and the normal root-key certificate for authenticating the upper apparatus.

Then, for example, when the upper apparatus 30 and the lower apparatus 40 mutually authenticate, in response to a request for communications from the lower apparatus 40, the upper apparatus 30 transmits to the lower apparatus 40 a first random number encrypted using the normal private key for the upper apparatus, along with a normal public-key certificate for the upper apparatus. At the lower apparatus 40 side, a normal root-key certificate for authenticating the upper apparatus is used to first confirm the validity of the normal public-key certificate for the upper apparatus (that there is no damage or tampering) so as to decrypt the first random number with the public key included therein when the validity is confirmed. When the decrypting is successful, the lower apparatus 40 is able to recognize that the upper apparatus 30 of the communications counterpart is certainly a subject of the normal public-key certificate for the upper apparatus so as to be able to specify the apparatus from identifying information included in the certificate. Then, success of an authentication can be determined depending on whether the specified apparatus is suitable as a communications counterpart.

Then, also at the upper-apparatus 30 side, receiving a normal public-key certificate for the lower apparatus that is transmitted thereto when authentication succeeds at the lower apparatus 40 side, and a random number encrypted with the normal private key for the lower apparatus so as to use a normal root-key certificate for authenticating the lower apparatus that is stored to perform the same authentication is enabled.

Now, this procedure is a process when the lower apparatus 40 by means of the HTTPS client-function section 41 requests for communications to the HTTPS server-function unit 32 of the upper apparatus 30 so that when the upper apparatus 30 by means of the HTTPS client-function section 31 requests for communications to the HTTPS server-function unit 42 of the upper apparatus 40, while the certificates and keys used are the same, the process of the upper apparatus 30 and the process of the lower apparatus 40 are reversed.

Now, in this communications system, while the lower apparatus 40 is a suitable communications counterpart for the upper apparatus 30 (for example, a subject apparatus for remote control by the upper apparatus 30), there is a need to store valid normal authentication information in the lower apparatus 40. However, when the lower apparatus 40 is no longer a suitable communications counterpart for the upper apparatus 30, the upper apparatus 30 is provided for nullifying normal authentication information of the lower apparatus 40. Then, as a process of this nullifying, the upper apparatus 30 is provided for transferring to the lower apparatus 40 a certificate set for nullifying so as to cause the lower apparatus 40 to set up the transferred certificate set.

This transferring of the certificate set preferably is performed by collating with the URL for communications destination as illustrated in FIG. 7. In this way, making common the format with the case of newly transferring to the lower apparatus 40 normal authentication information so as to cause the lower apparatus 40 to set up the transferred normal authentication information is enabled. Moreover, for a command, using a common one with the case of newly transferring the normal authentication information so as to cause the lower apparatus 40 to set up the transferred normal authentication information is enabled.

In other words, transferring preferably is conducted by collating a certificate set being a collection of a public-key certificate, a private key, and a root-key certificate, with such items as an URL (Uniform Resource Locator) being information for identifying a communications destination for accessing using the certificate set as described above.

Moreover, while various choices are possible for making which certificates or keys out of the certificate set for nullifying to be for nullifying, in an example as illustrated in FIG. 7, a public-key certificate for nullifying is provided for inclusion as a public-key certificate for the lower apparatus. At this time, a private-key for the lower apparatus, a root-key certificate for authenticating the upper apparatus, and the URL for communications destination may be the same ones as those being stored in the lower apparatus 40 at the time of trying to nullify the public-key certificate. Then, such certificate set and URL for communications destination may be generated by the nullifying-information generating section 36.

Furthermore, in the lower apparatus 40, for simplifying communications control, a certificate set for use in normal communications with the upper apparatus 30 (normal authentication information) is set to be always of one type. Therefore, when setting a new certificate set or URL, it is done in a format such as to overwrite the previous certificate sets or URLs. For example, a case is considered such that in the certificate storage 45 a normal certificate set 60 configuring normal authentication information as illustrated in FIG. 8 is stored as a certificate set for use in communicating with the upper apparatus 30 and "https://www.cal.co.jp" of the normal URL is being registered as a destination 65 for communicating when requesting for communications to the upper apparatus 30.

It is noted that a storage area for storing a certificate set and a storage area for storing a URL to which a communication is requested when using the certificate set for authenticating do not have to be necessarily adjacent or proximate as long as grasping of the correspondence between the certificate set and the URL is enabled.

In this case, a public-key certificate for nullifying 71 being included in a certificate set for nullifying 70 as represented with a letter D is a public-key certificate having the starting and ending dates/times of the validity period being the same and having provided an unsuitable validity period without any validity period. Therefore, the upper apparatus 30 upon receiving this public-key certificate for nullifying 71 from the lower apparatus 40 in authentication is enabled to determine that the authentication has failed as the certificate is deemed to not fall within the validity period, just by referring to validity-period information.

Figure 28B:
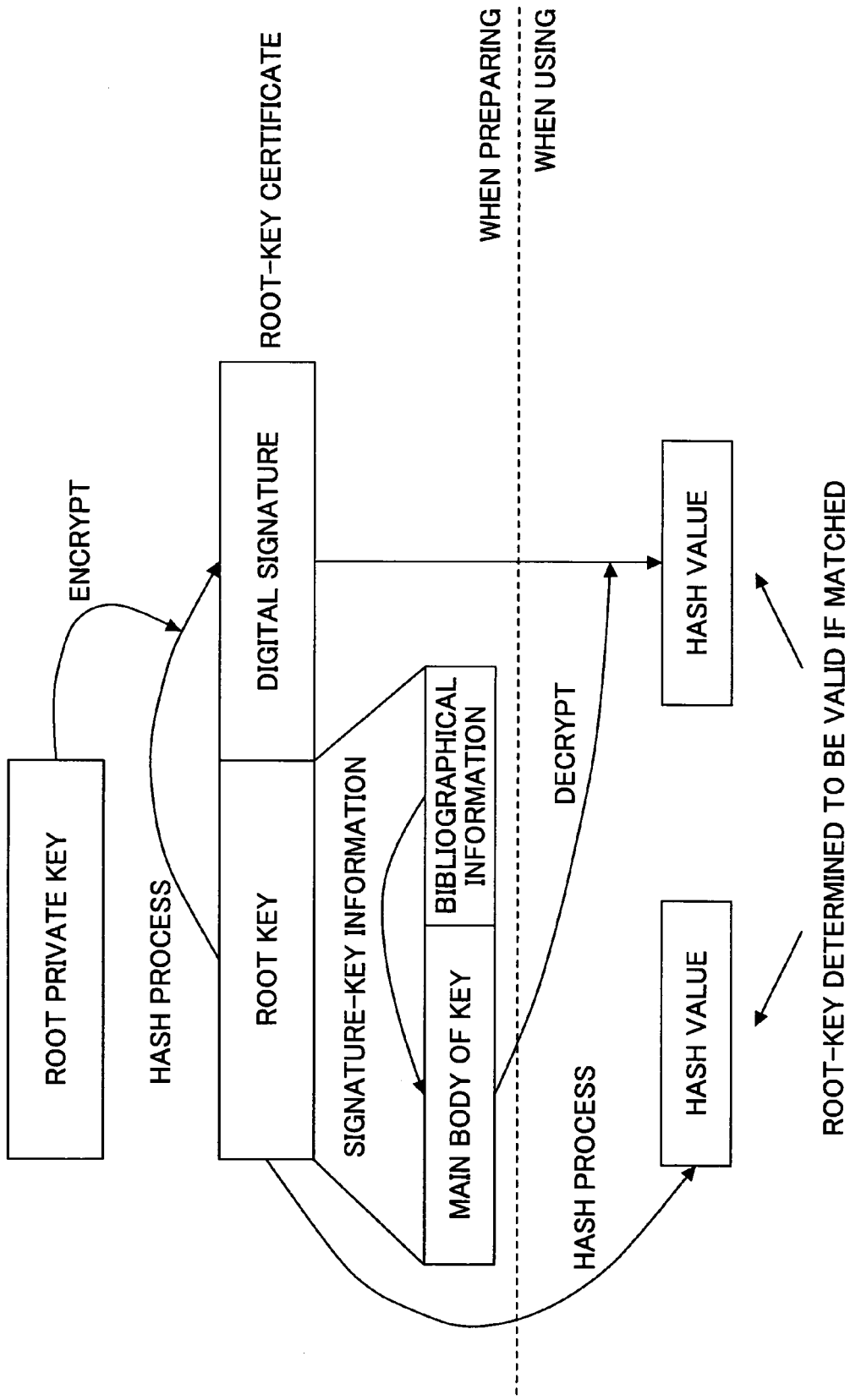

It is noted that as such public-key certificate 71 for nullifying having bibliographical information modified as illustrated in FIG. 28A no longer matches with a hash value obtained by decrypting a hash value of the public key and the digital signature. However, determining a failure of authentication is possible from only the validity-period information without the need to perform such process as described above.

Moreover, if the ending date/time of the validity period is prior to the date/time at the time of setting, an error occurs in a contents checking as described below so that the ending date/time is preferably set approximately a few days after the date/time at the time of setting.

Figure 9:
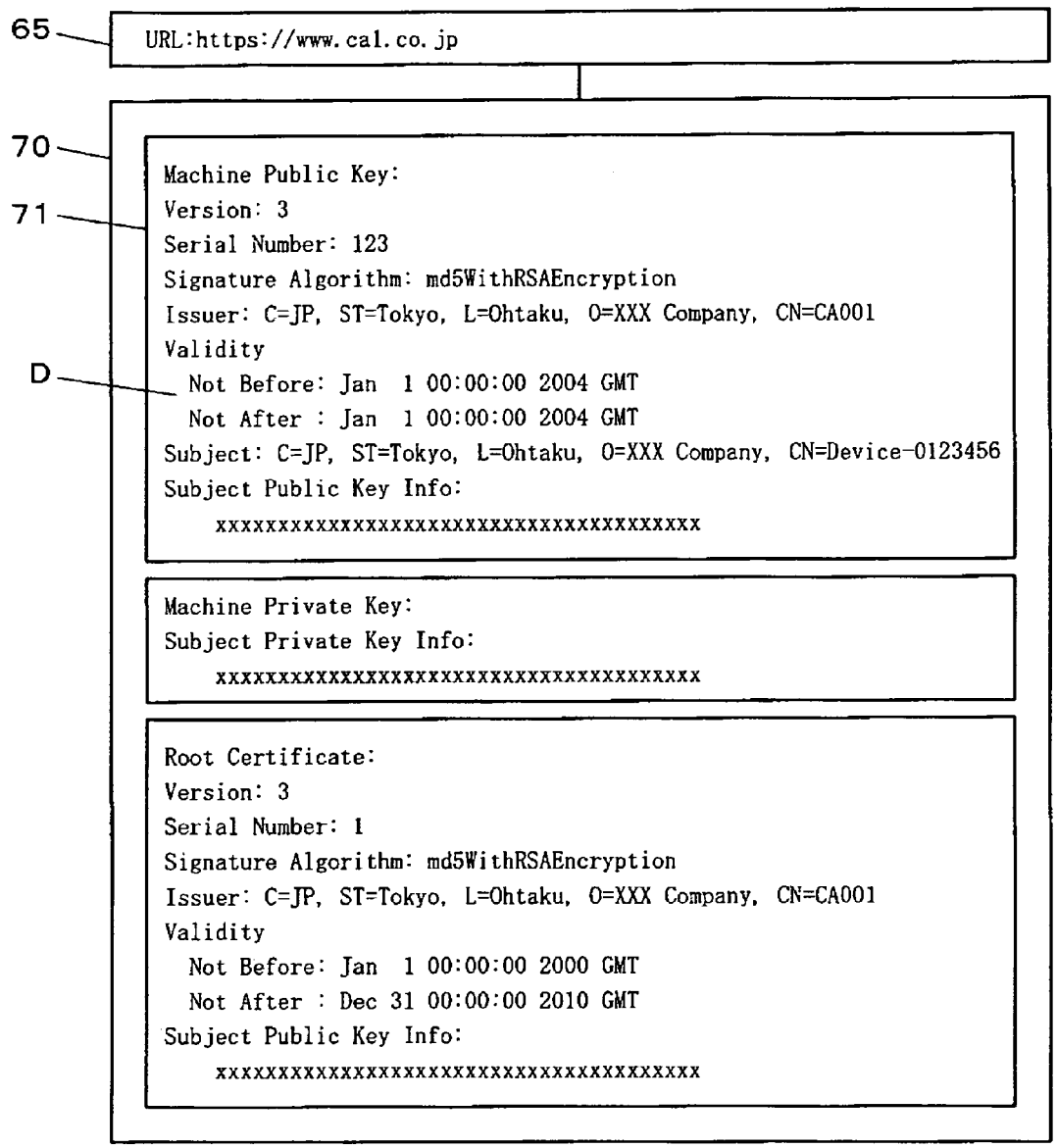
FIG. 9 is a diagram illustrating the state of storage with the communications destination when communicating using the public-key certificate set and its certificate for communicating with the upper apparatus in the certificate storage of the lower apparatus as illustrated in FIG. 1, when setting information for nullifying.

Now, examples of the certificate set for nullifying and communications-destination information for nullifying other than the one illustrated in FIG. 9 are described.

Figure 10:
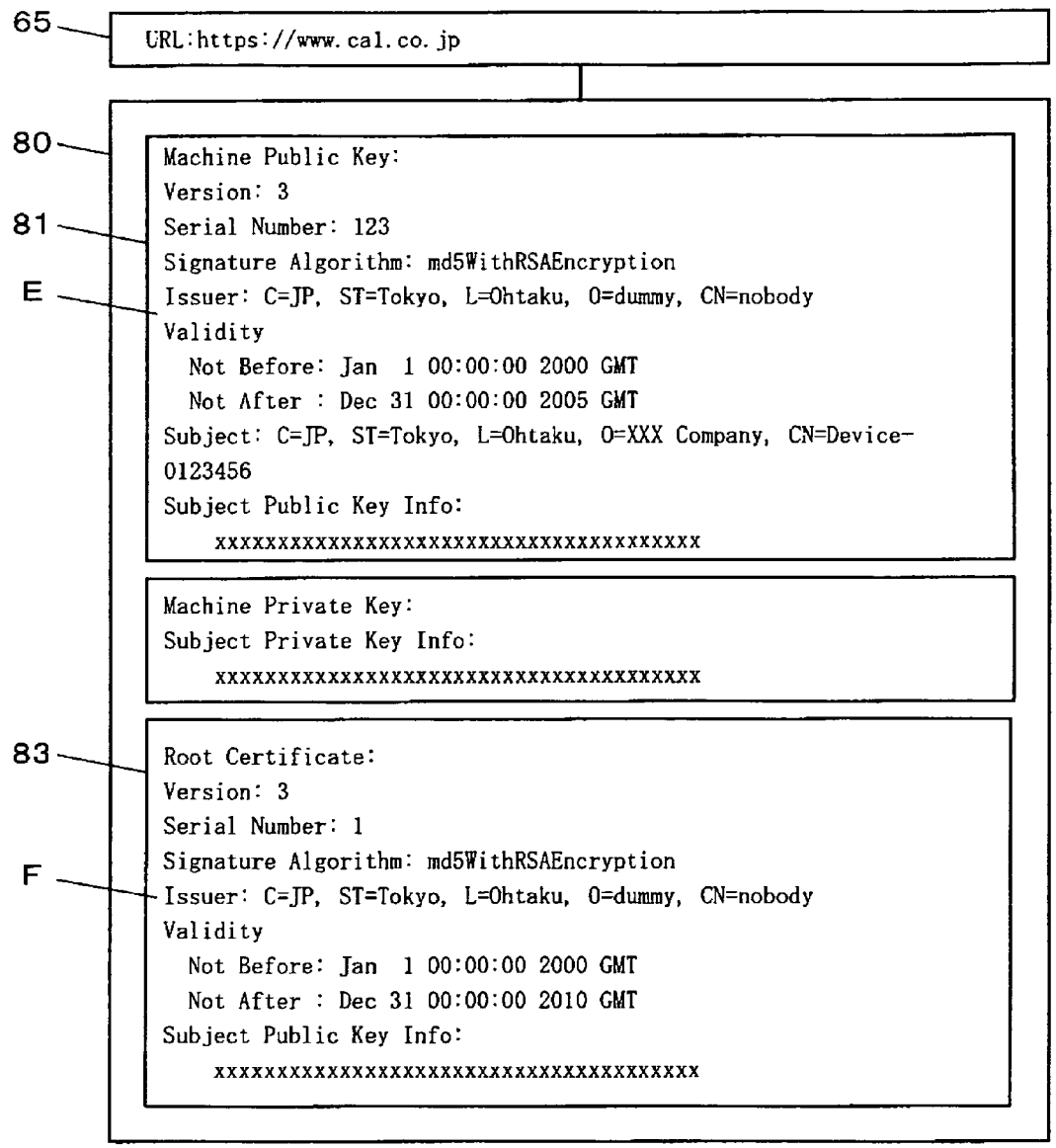
FIG. 10 is a diagram illustrating an exemplary information set for nullifying that is different from the information set for nullifying in FIG. 9.

For example, the certificate set for nullifying may be one provided with unsuitable issuer information. This example is illustrated in FIG. 10. In this example, in a public-key certificate 81 for nullifying that is included in a certificate set for nullifying 80, as represented with a letter E, a dummy information item is provided as issuer (CA) information. Moreover, a root-key certificate is set as a root-key certificate 83 for nullifying that is provided with a dummy information item as issuer information as represented with a letter F.

Even using such certificate set for nullifying enables determining a failure of authentication as the certificate is one not being issued by a suitable issuer just by referring to issuer information. Moreover, in the case of this example, preventing a circumstance such that a normal public-key certificate or a root-key certificate is leaked out from the lower apparatus 40 so as to be abused is enabled.

Figure 11:
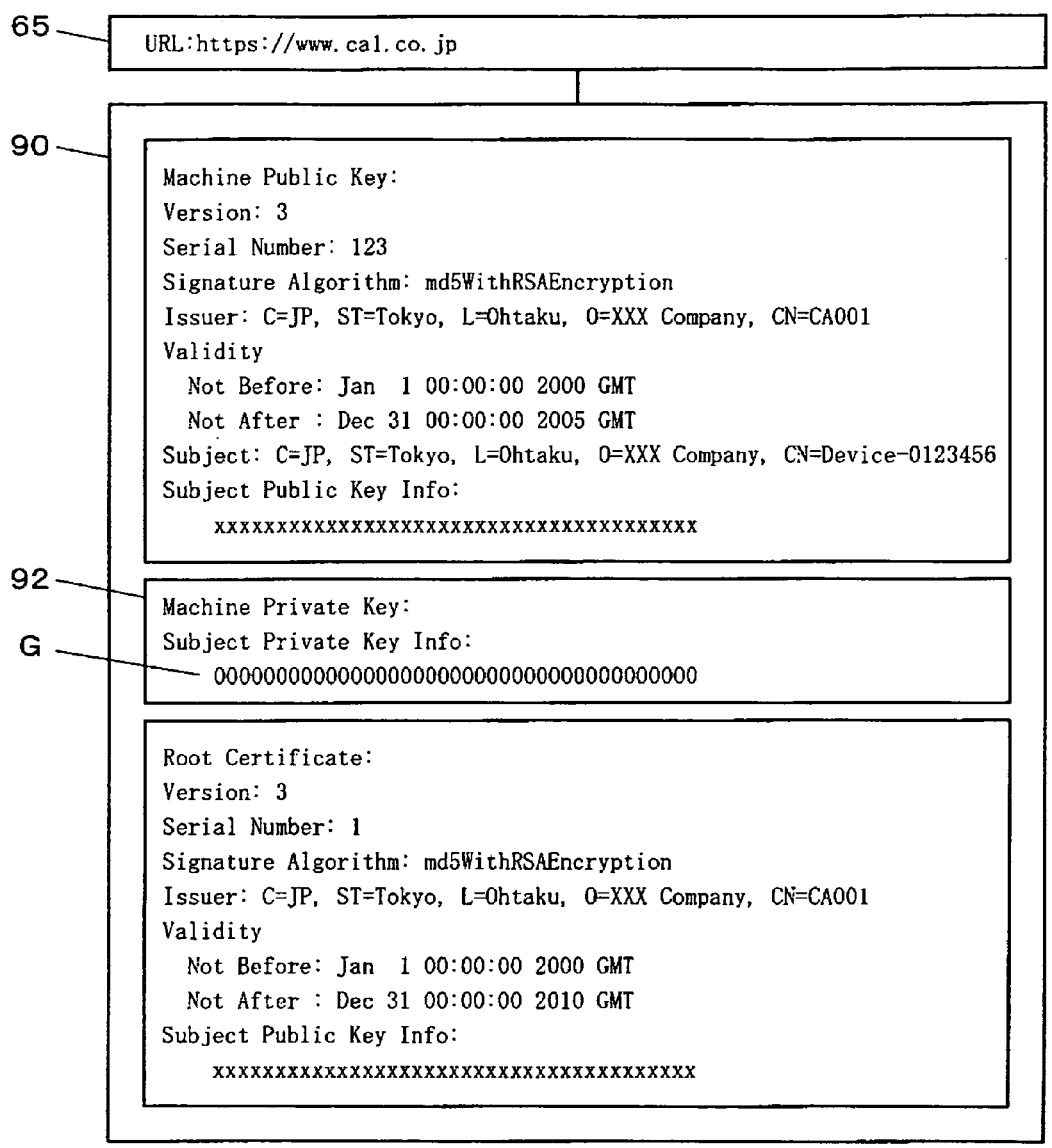
FIG. 11 is a diagram illustrating another exemplary information set for nullifying that is different from the information set for nullifying in FIG. 9.
Figure 12:
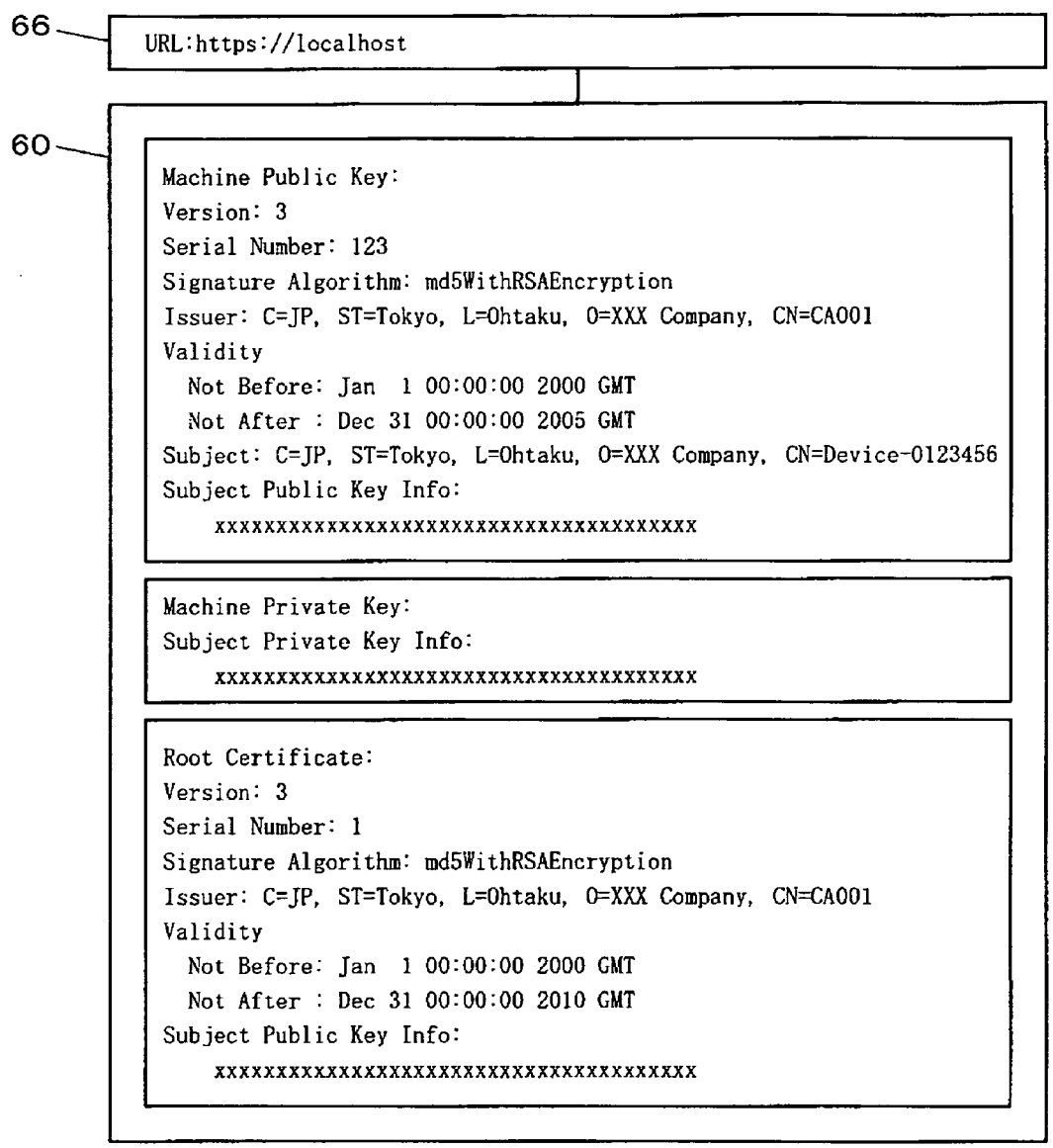
FIG. 12 is another diagram illustrating another exemplary information set for nullifying that is different from the information set for nullifying in FIG. 9.

Furthermore, the certificate set for nullifying may be one such that a private key is a private key for nullifying. This example is illustrated in FIG. 11. In this example, the private key being included in a certificate set for nullifying 90 is set as a private key for nullifying 92 and as represented with a letter G key data sets are set to be all zero(0). Such private key not corresponding to a public key being included in a normal public-key certificate causes authentication at the upper apparatus 30 side to fail even when the lower apparatus 40 attempts to access the upper apparatus 40 using the certificate set for nullifying 90.

Then, in the case of this example, preventing a circumstance such that a normal private key is leaked out from the lower apparatus 40 so as to abused is enabled.

Figure 13:
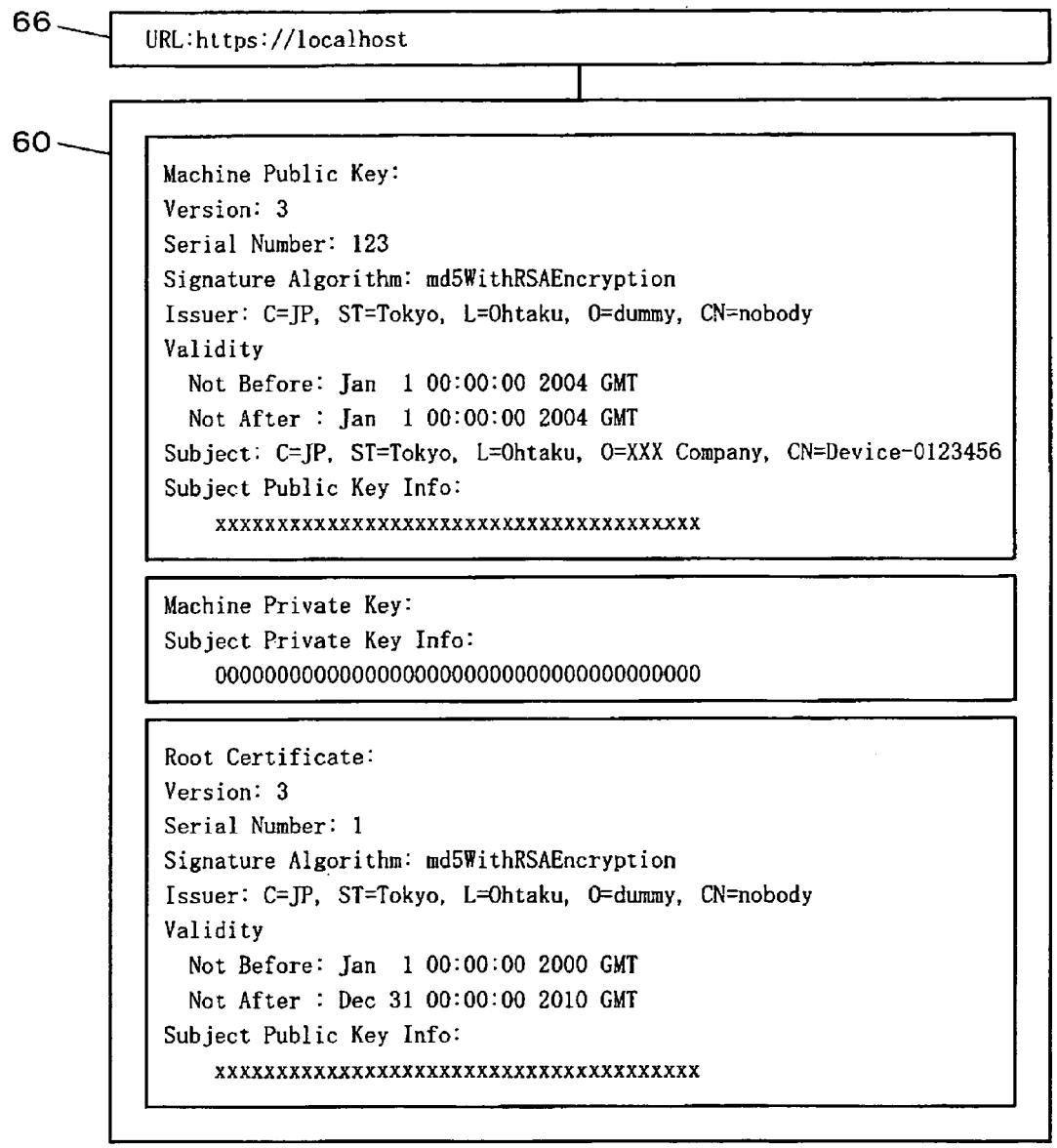
FIG. 13 is yet another diagram illustrating another exemplary information set for nullifying that is different from the information set for nullifying in FIG. 9.

Moreover, a URL for communications destination may be set to be a URL for nullifying. This example is illustrated in FIG. 13. In this example, as a communications counterpart 66 when requesting for communications to the upper apparatus 30, "https://localhost" being a URL representing the lower apparatus 40 itself is provided. When having registered such URL as a destination for requesting communications, as a request for communications from the lower apparatus 40 no longer reaches the upper apparatus 30, at the upper apparatus 30 side, the need for dealing with a lower apparatus 40 that is no longer a suitable communications counterpart is eliminated, enabling reducing a process load at the upper apparatus 30. Moreover, setting a URL for nullifying as one representing the lower apparatus 40 itself eliminates the possibility of transmitting to the network an unnecessary request for communications, enabling reducing the communications process load on the overall network.

It is noted that in this case while the certificate-set portion may remain as a normal certificate set, from the point of view of preventing a leakage, this portion is preferably also set to be a certificate set for nullifying.

Moreover, as a communications destination, a URL of such item as a server for cancellation processing may be set. In this case, the server for cancellation processing, etc. detecting whether an access is made from the lower apparatus 40 enables detecting whether the lower apparatus 40 is kept connected to the network or is removed. Then, in this way, when a leased item is kept connected to the network after expiring of a contract period, contacting a customer so as to seek a collection of the leased item is enabled.

Furthermore, as a communications destination, it is possible to set an IP address such as "http://127.0.0.1".

In addition, it is possible to use for a public-key certificate for nullifying a certificate having as the end of the validity period a timing to have a public-key certificate nullified such as expiring of an contract period. In this way, it is possible to set a certificate set before the date to have the public-key certificate nullified, enabling easily managing the timing of the nullifying process.

It is noted that as a matter of course features of each of the examples as described above may be arbitrarily combined for applying. For example, setting all of a URL, a public-key certificate, a private key, and a root-key certificate to be for nullifying is greatly advantageous from the points of view of both reducing the process load and preventing a leakage of authentication information. In this way, the URL for communications counterpart and the certificate set become as illustrated in FIG. 13 for example.

Figure 14:
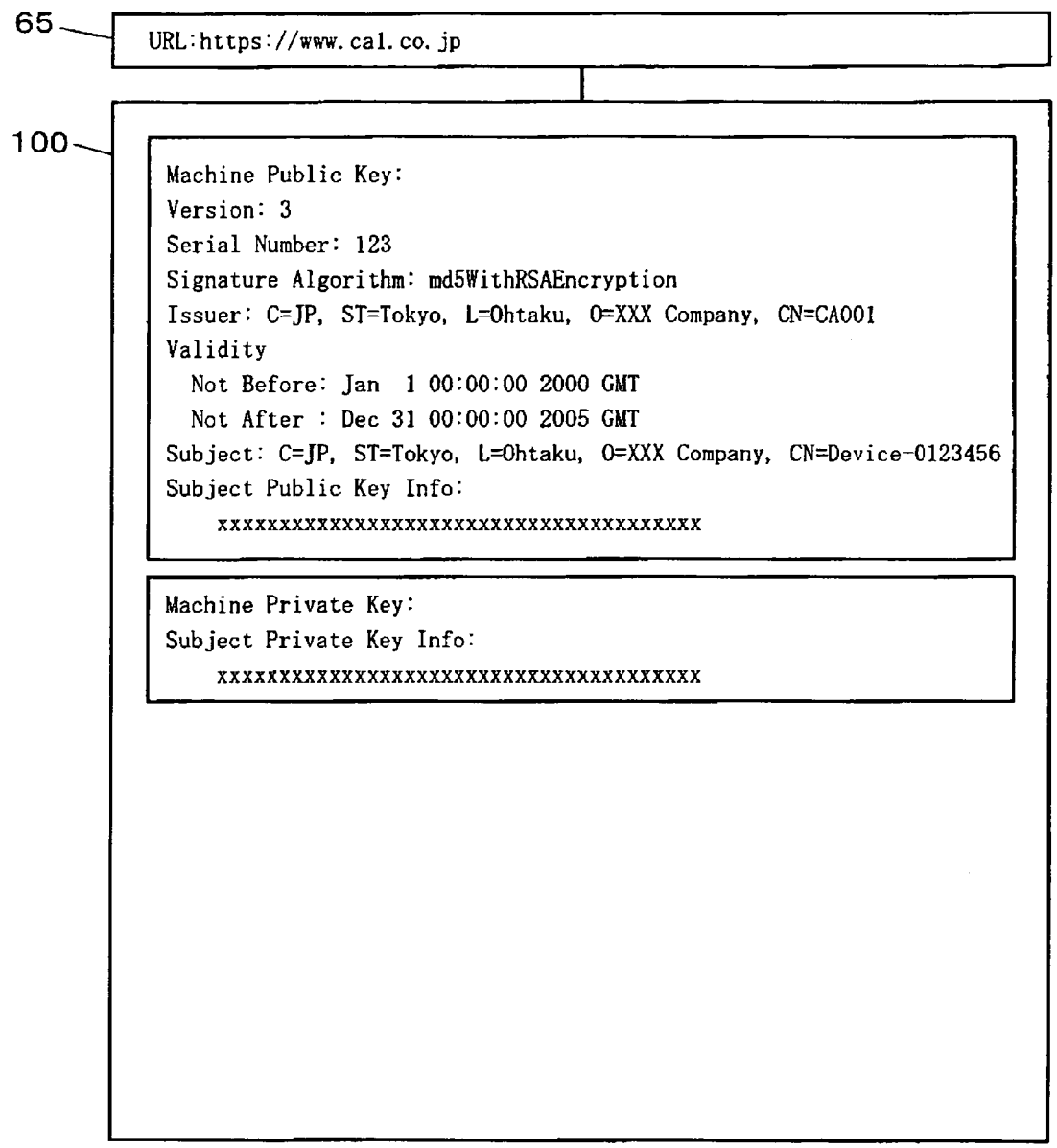
FIG. 14 is yet another diagram illustrating yet another exemplary information set for nullifying that is different from the information set for nullifying in FIG. 9.

Moreover, setting the certificate set for nullifying as one not including a root-key certificate is possible. This example is illustrated in FIG. 14. In this example, a certificate set for nullifying 100 is set to be a certificate set not having included a root-key certificate for authenticating the upper apparatus. When the upper apparatus 30 and the lower apparatus 40 mutually authenticate as illustrated in FIG. 27, authentication is caused to fail as the validity of a common-key certificate being received from the upper apparatus 30 may not be confirmed unless there is a root-key certificate in the lower apparatus 40.

It is noted that out of the examples illustrated in FIGS. 9 through 14 as described above, those examples having modified a public-key certificate and/or a root-key certificate to those for nullifying are all ones that the public-key certificate and/or the root-key certificate as described above are modified to a certificate for nullifying that has the contents such as to nullify the format valid as a digital certificate and the certificate itself. More specifically, a certificate for nullifying is provided by not modifying the portion of the format from the normal certificate but modifying only the contents portion. Moreover, in the certificate set, for a possible case such as to have the format in which that the number of root keys is arbitrary, even eliminating a root-key certificate as in an example illustrated in FIG. 14 enables maintaining the validity of the format.

In the lower apparatus 40, there may be a possibility of performing in order to prevent having to set erroneously an invalid certificate a format checking for checking before setting a certificate that the format of the certificate meets a predetermined condition. Such a case is designed so that neither causing the lower apparatus 40 to set a certificate for nullifying nor nullifying the certificate is possible unless it is one such as to pass the checking as described above.

It is noted that based on this objective it can be said that it is a valid format as long as it is a certificate such as to be able to pass the format checking. Then, while the nature of the format checking may differ from apparatus to apparatus, in its simplest form, it may be just determining whether the certificate complies with the ANS format being a coding scheme of the certificate.

Moreover, the lower apparatus 40 may perform not only the format checking but also a contents checking for checking the integrity of the contents. For example, this may be checking with an encrypting/decrypting process that the private key and the public key corresponds or checking that the validity period is after the present date/time. Then, when the lower apparatus 40 performs such contents checking, as providing for a certificate for nullifying with one that is able to pass the contents checking as well is needed.

While what condition to be met for simultaneously achieving nullifying a certificate and passing the contents checking depend on the nature of the checking, normally meeting this condition is enabled as long as it is one illustrated in FIG. 9 or FIG. 10.

Next, a process for transferring to the lower apparatus 40 such item as a certificate for nullifying as described above is described in greater detail. It is noted that while a case of transmitting to the lower apparatus 40 a certificate set for nullifying is described in the process described below, the same process flow applies to a case of transmitting communications-destination information for nullifying in lieu of or in addition to the certificate set for nullifying as described above.

Figure 15:
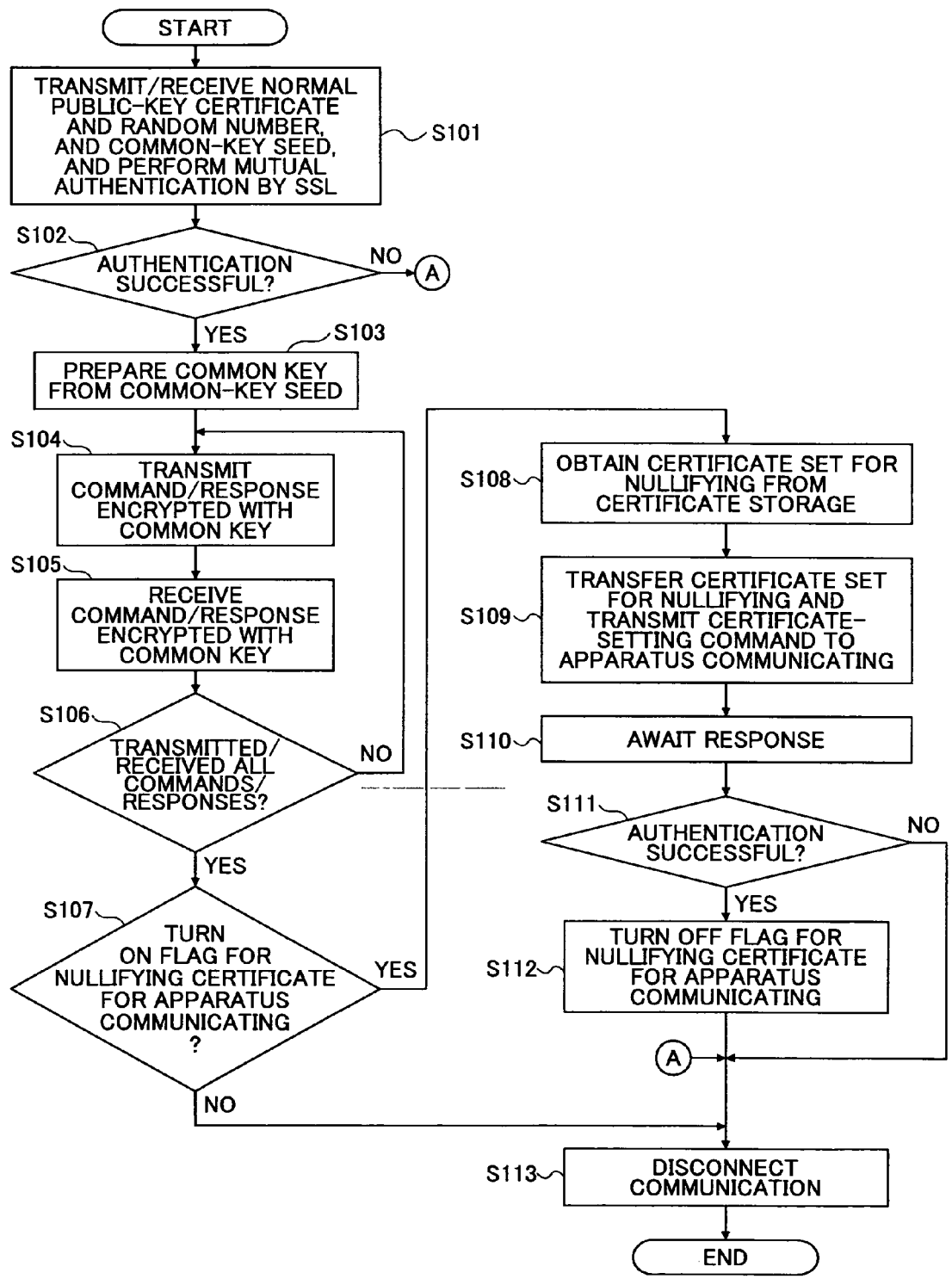
FIG. 15 is a flowchart illustrating a process of executing when the upper apparatus as illustrated in FIG. 1 receives a request for communications at a normal URL.

In FIG. 15 is illustrated a process of the upper apparatus 30 executing when having received a request for communications at a URL (a normal URL) for authenticating using normal authentication information. This process is a process regarding the method of nullifying digital certificates of the present invention.

It is noted that the process of steps S101 through S106 and S113 is performed in a manner unrelated to nullifying a public-key certificate. Then, the process of steps S107 through S112 is a process for nullifying a certificate.

In the communications system illustrated in FIG. 1, the CPU of the upper apparatus 30, upon receiving a request for communications at the normal URL, starts the process illustrated in the flowchart in FIG. 15.

Then, first in step S101 a normal public-key certificate and a random number and a common-key seed are transmitted/received with the apparatus originating the request for communications, and mutual authentication using the SSL as illustrated in FIG. 27 is performed. This process includes a process of obtaining information identifying the originator of the request for communications from the received public-key certificate.

Then, in step S102 whether this authentication has succeeded is determined and then if not failed, the process proceeds to S114 for disconnecting communications without performing the process so as to terminate the process. On the other hand, if successful, communication is established with the originator of the request for communications so as to proceed to step S103 so as to generate a common key from the common-key seed exchanged in step S101. It is noted that a communications path established at this time is a communications path according to the SSL based on the normal public-key certificate.

Then in step S104 a command and a response to a received command are encrypted with the generated common key so as to be transmitted to an apparatus currently communicating (the lower apparatus 40 here), and in step S105 a command and a response to a transmitted command in the state of being encrypted with the same common key are received from the apparatus currently communicating. Then, in step S106 whether all commands and responses are transmitted/received is determined. Then, if there is any remaining one, the process returns to step S104 so as to repeat the process, and if all are transmitted/received, the process proceeds to step S107.

It is noted that steps S104 and S105 do not have to be in any particular order and are omitted when there are no commands/responses to be transmitted/received. Then, executing the process regarding the received command so as to generate a response, and interpreting the contents of the received response so as to perform the operations corresponding to the interpreted results, are to be executed separately from the flowchart illustrated in FIG. 15, having the received commands and responses stored.

In the next step S107 whether the flag for nullifying a certificate for the apparatus currently communicating is turned ON is determined.

Here, the flag for nullifying a certificate as illustrated in FIG. 16 is a flag that the upper apparatus 30 has stored therein, for each lower apparatus 40 which may become a communications counterpart, in correspondence with ID (information) identifying the lower apparatus. Then, it is a flag which indicates that there is a need for nullifying authentication information of an apparatus having corresponding ID when it is ON. Moreover, the setting of this flag may be performed manually by an operator of the upper apparatus 30, or the upper apparatus 30 itself may perform automatically. In lieu of the flag as described above, a condition table being provided with an equipment number of the lower apparatus requiring authentication information to be nullified may be used.

It is noted that the ID of the lower apparatus 40 may be grasped from information being provided in the normal public-key certificate for the lower apparatus that is received from the lower apparatus 40 at the time of authenticating, or may have the lower apparatus 40 transmit via the communications path based on the normal public-key certificate. Moreover, for determining whether to nullify, besides the ID as described above, arbitrary information may be used that is provided in the normal public-key certificate received from the lower apparatus 40, or that is received via the communications path based on the normal public-key certificate.

Then, in step S107 if this flag for nullifying the certificate is OFF, as there is no need to transmit the certificate set, without performing the processing, the process proceeds to step S113 so as to disconnect the communications for terminating the process.

On the other hand, in step S107 if the flag for nullifying the certificate is ON, the process proceeds to the process regarding transmitting the certificate for nullifying in and after step S108.

Then first in step S108, a certificate set for nullifying is obtained from the certificate storage 35. This certificate set may be obtained by having the nullifying-information generating unit 36 generate immediately.

Then, in step S109, the certificate set for nullifying that is obtained in step S108 is transmitted to the apparatus of the communications counterpart (the lower apparatus 40). Then, a certificate-setting command for requesting such that the transmitted certificate set is set as a certificate set for use in communicating with the upper apparatus 30 is transmitted to the apparatus of the communications counterpart.

It is noted that various ones as described using FIGS. 9 through 14 are possible as a certificate set (and/or communications-destination information) to be transmitted here.

Then, such transmission may be performed by transmitting a certificate set as a parameter of a certificate-setting command. Then, these transmissions are to be performed via a secure communications path according to the SSL that is established using the normal certificate set. Moreover, it is possible to provide for first transmitting a certificate and transmitting a certificate-setting command after completion of the transmission.

Once this process is completed, in step S110 the process waits for a response to the certificate-setting command. Then in step S111 it is determined as to whether the setting of the certificate set has succeeded. Then, if successful, the process proceeds to step S112 so as to turn OFF the flag for nullifying certificate for the apparatus currently communicating that has completed setting the certificate for indicating that the nullifying the authentication information is no longer necessary. Subsequently the process proceeds to step S113 so as to disconnect the communications for terminating the process.

If not successful in step S111 (including the case with no response during a predetermined period), without processing the process proceeds to step S113 so as to disconnect the communications for completing the process. In this case, when there is a following request from the same lower apparatus 40 to the normal URL, again setting the certificate set for nullifying is tried.

According to the process as described above, the upper apparatus 30 is able to transmit a certificate set for nullifying, via a secure communications path established using normal authentication information, as well as to request for setting in the lower apparatus 40 the certificate set for nullifying.

Here, in FIG. 17 is illustrated a process which the lower apparatus 40 executes when receiving a certificate-setting command from the upper apparatus 30.

The CPU of the lower apparatus 40, when the apparatus receives a certificate-setting command from the upper apparatus 30, starts the process illustrated in a flowchart in FIG. 17. Then, in step S201 a format checking is performed for checking the format of a certificate set for which setting is requested with a certificate-setting command. Then, if the result is unsuitable (NG), in step S205 an error response indicating that the setting of a certificate set and a URL has failed is returned so as to terminate the process. It is noted that in step S201 performing a contents checking may be provided for.

On the other hand, if the result is suitable (OK), the process proceeds to step S202 for setting the certificate set for which setting is requested by the certificate-setting command as a certificate set for use in communicating with the upper apparatus 30.

Then, in step S203 a response to the certificate-setting command is returned to the upper apparatus 30 and in step S204 the communication is disconnected for reactivating itself. This reactivating is required when changing an important setting in the lower apparatus 40 that here corresponds to setting the certificate set. When reactivating, an authorization of reactivating may be sought from the user. Moreover while FIG. 17 illustrates such that the process returns to the original process after step S204, actually at the time of the reactivating in step S204 the process is suspended.

It is noted that the reason the process regarding transferring of certificates of the steps S107 through S112 is performed subsequent to the process regarding the transmitting/receiving of commands and responses of the steps S104 through S106 in the process illustrated in FIG. 15 is to be able to transmit/receive other commands and responses before the communications get disconnected by the reactivation in the step S204 even when having to set the certificate.

According to the process as described above, the lower apparatus 40 collates the certificate set and the URL that are received from the upper apparatus 30 so as to have the collated results stored therein for use in subsequent communications with the upper apparatus 30. Then, if the setting of the certificate set for nullifying as a certificate set is successful, after being reactivated, even when communicating with the upper apparatus 30, as the apparatus no longer has authentication information, authentication fails, making impossible establishing a communications path. In other words, it can be said that the public-key certificate of the lower apparatus 40 is nullified.

It is noted that the setting in step S202 is performed by having to store the certificate set in the certificate storage 45.

Moreover, when receiving a certificate set for which setting is requested by a certificate setting command, separately from a certificate-setting command, preferably, having to store temporarily the received certificate set in a suitable storage area so as to start the process illustrated in FIG. 17 at the time of having received the certificate-setting command, for setting the certificate set is provided for.

Next an exemplary process sequence for the upper apparatus 30 and the lower apparatus 40 to execute the process of nullifying the public-key certificate as described above is described. In FIG. 17 is illustrated this process sequence.

In this example, first the lower apparatus 40 when communicating with the upper apparatus 30 confirms the URL to which a request for communications is to be transmitted (S301), set the HTTPS client-function section 41 to function as the client for the upper apparatus for transmitting the request for communications to the normal URL confirmed (S302). In this case, at the upper apparatus side 30, the HTTPS server-function section 32 receives a request for communications so as to pass on this request to the authentication processor 33. Then the authentication processor 33 according to the SSL protocol returns to the lower apparatus 40 a first random number encrypted with a normal private key for the upper apparatus that is stored in the certificate storage 35, together with a normal public-key certificate for the upper apparatus that is stored in the same certificate storage 35 (S303).

At the lower apparatus 40 side, while the returned random number and the certificate are passed on to the authentication processor 43 for authenticating, here as the validity of the normal public-key certificate for the upper apparatus may be confirmed using a normal root-key certificate for authenticating the upper apparatus that is stored in the certificate storage 45, the authentication is determined to be successful so that the response indicating the success is returned (S304) Then, upon the upper apparatus 30 transmitting a request for a certificate to the lower apparatus (S305), the lower apparatus 40 returns to the upper apparatus 30 a second random number encrypted with a normal private-key for the lower apparatus that is stored in the certificate storage 45 together with, a normal public-key certificate for the lower apparatus that is stored in the same certificate storage 35. Moreover here, as mutual authenticating is performed, a common-key seed encrypted using the normal public-key for the upper apparatus that is received in step S303 is also returned together with the second random number (S306).

At the upper-apparatus 30 side, while these are passed on to the authentication processor 33 for authenticating, here as the validity of the normal public-key certificate for the lower apparatus that is received may be confirmed using a normal root-key certificate for authenticating the lower apparatus that is stored in the certificate storage 35, the authentication is determined to be successful so as to confirm an encrypting method for use in subsequent communications (S307).

In the process as described above, communications via a secure communications path according to the SSL is established between the upper apparatus 30 and the lower apparatus 40 so that thereafter the upper apparatus 30 and the lower apparatus 40 transmit/receive commands/responses in a state such that communications are encrypted with a common key generated using a common-key seed exchanged (S308).

Then, the upper apparatus 30 side when determining that there is a need to nullify the public-key certificate of the lower apparatus 40, obtains a certificate set for nullifying from the certificate storage 35 (S309) for transferring to the lower apparatus 40 with a certificate-updating command (S310).

Then, the lower apparatus 40 sets the certificate set for nullifying as a certificate set for use in authentication when communicating (S311). The process as described above completes the updating of the certificate set so that the lower apparatus 40 disconnects the communications so as to reactivate itself.

The process for the lower apparatus 40, after reactivating, requesting for communications to the upper apparatus 30 depends on the nature of the certificate set for nullifying that is set in the lower apparatus.

Below a few examples are described on this matter.

First, when having set a certificate set for nullifying, including a public-key certificate for nullifying, even when the lower apparatus 40 after reactivating requests for communications to a normal URL in an attempt to get authenticated, as a certificate to be transmitted is the public-key certificate for nullifying, the upper apparatus 30 determines that the authentication has failed. Then, such determining causes the lower apparatus 40 to be in a state of not being able to communicate with the upper apparatus 30 (S312 through S318).

It is noted that as the lower apparatus 40 side is still in a state of being able to confirm the validity of the normal public-key certificate for the upper apparatus using a root key being included in a normal root-key certificate for the upper apparatus, unless performing other processes of nullifying, the lower apparatus 40 remains to be in a state of having to recognize the upper apparatus 30 as a suitable communications counterpart.

Moreover, while when setting a certificate set for nullifying, including a private key for nullifying, as the random number which the lower apparatus 40 has transmitted to the upper apparatus 30 with the public-key certificate cannot be decrypted with a common key contained in the certificate, the upper apparatus 30 determines that the authentication has failed, the process sequence is the same as for a case of the steps S312 through S318 as described above.

Figure 19:
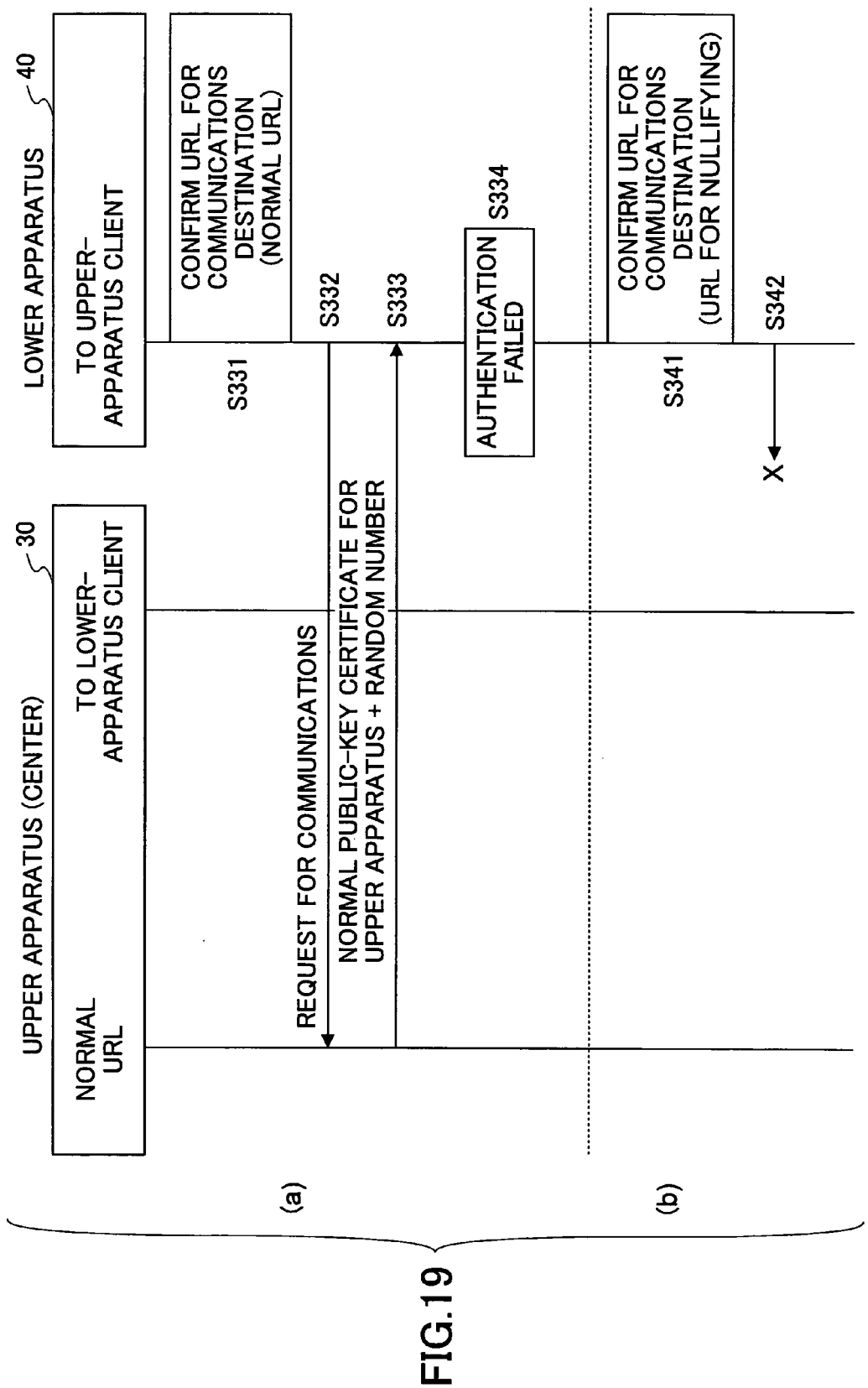
FIG. 19 is a diagram illustrating an exemplary process sequence, different from the process sequence illustrated in FIG. 18, when the lower apparatus being nullified authentication information attempts to make a request for communications to the upper apparatus.

Then in FIG. 19 illustrating other examples, when setting a certificate set for nullifying, including a root-key certificate for nullifying, as the lower apparatus 40 cannot confirm the validity of the normal public-key certificate for the upper apparatus that is received from the upper apparatus 30, as represented with (a) in FIG. 19, authentication fails at the lower apparatus 30 side, making impossible the lower apparatus 40 to communicate with the upper apparatus 30 (S331 through S334).

It is noted that as described above setting a URL for nullifying as a URL for communications destination, in lieu of or in addition to the setting of the certificate set for nullifying is possible. Then, in this case, as represented with (b) in FIG. 19, as a communications request does not reach the upper apparatus 30 at all, authenticating is not initiated, making impossible the lower apparatus 40 to communicate with the upper apparatus 30 (S341, S342).

In the communications system illustrated in FIG. 1, when trying to nullify a public-key certificate of the lower apparatus 40, performing such a process as described above provides for transferring from the upper apparatus 30 to the lower apparatus 40 a certificate set for nullifying, and/or a URL for nullifying.

Then, modifying a certificate set of the lower apparatus 40 to one for nullifying enables preventing circumstances such that a normal certificate set leaks out from the lower apparatus 40 so as to be abused as the lower apparatus 40 no longer has stored therein a normal certificate set. Even when examining the individual items of the certificate set, as described using FIGS. 9 through 14, it is possible to nullifying each one of a common-key certificate, a private key, and a root-key certificate.

Moreover, setting communications-destination information of the lower apparatus 40 as a URL for nullifying enables preventing a request communications to be transmitted to the upper apparatus 30 and reducing a process load on the upper apparatus 30.

Figure 20:
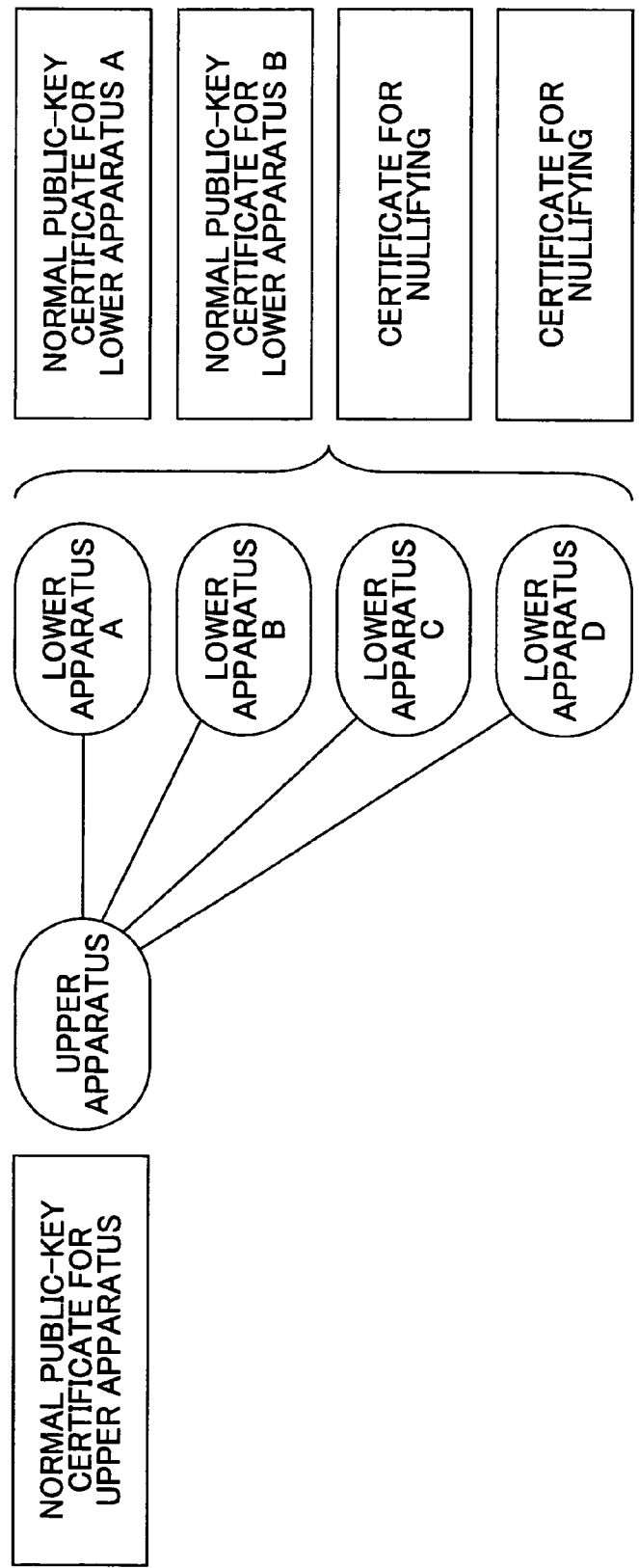
FIG. 20 is a diagram illustrating an exemplary system configuration when having provided multiple lower apparatuses in the communications system as illustrated in FIG. 1.

It is noted that when there are multiple lower apparatuses 40, the upper apparatus 30 executing the process as illustrated in FIG. 15 whenever receiving a request for communications from each lower apparatus 40 enables having each lower apparatus 40 requiring nullifying of authentication information to sequentially set the certificate set for nullifying. Then, for example when nullifying a public-key certificate, eventually as illustrated in FIG. 20, storing a normal public-key certificate in lower apparatuses suitable as communications counterparts (A and B here) and storing a certificate for nullifying in lower apparatuses unsuitable as communications counterparts (C and D here) are enabled.

Moreover, according to the process as described above, normal authentication information being used for communications by the upper apparatus 30 and the lower apparatus 40 is used to establish a secure communications path according to the SSL, and the communications path as described above is used to transfer from the upper apparatus 30 to the lower apparatus 40 the certificate set for nullifying. Therefore, securely transferring to the lower apparatus 40 also a certificate set for nullifying is enabled.

Here, in this communications system, for simplifying the process, as a command for setting a certificate set for nullifying, one which is common to the command for setting for use in setting normal authentication information is used. On the other hand, when having the lower apparatus 40 set a certificate set using the latter command, as is done here, it is preferable to have a format checking performed so as not cause a certificate containing an error to be set. Therefore, even for a certificate set for nullifying, it is necessary to make the contents of the certificate set as those that are able to clear the format checking.

Thus, the certificate for nullifying as illustrated in FIG. 9, etc., is set such as to keep each item of the certificate as it is and to modify only a part of the contents, such as a validity period. Therefore, as unlimited leakages to third parties is not preferable that even for a certificate for nullifying, it is preferred to transfer via a secure communications path as described above.

Moreover, with a transferring path according to the SSL, transferring after confirming that a communications counterpart is certainly the lower apparatus for which authentication information is to be nullified is enabled. More specifically, providing a public-key certificate with an identifying information item such as a serial number of an issuing apparatus prevents spoofing. Therefore, preventing erroneously nullifying a common-key certificate of the lower apparatus 40 being a suitable communications counterpart is enabled. Moreover, having provided for transferring when the flag for nullifying the certificate is ON, managing the state of the flag for nullifying the certificate as a matter of course enables continuing communications using normal authentication information for an apparatus not requiring nullifying. In other words, providing for determining whether nullifying is needed based on receiving of a normal public-key certificate from the lower apparatus 40 enables easily and accurately identifying the lower apparatus 40 requiring nullifying so as to transfer a certificate set for nullifying and/or a URL for nullifying.

It is noted that in the process as described above, with having provided in the normal public-key certificate for the lower apparatus the country code, company name, model information, etc., of the apparatus being the subject to be issued, referring to these information items in lieu of the flag for nullifying the certificate enables determining, by country, by company, or by model, whether nullifying the certificate is required. Furthermore, it is possible to refer to the serial number of the certificate provided in the normal public-key certificate for the lower apparatus, or the user information, etc., so as to determine whether nullifying the certificate is required. Moreover, it is possible to have the lower apparatus 40 transmit these information items via the communications path based on the normal public-key certificate so as to refer to the information items for determining whether nullifying the certificate is required.

Then the conditions for such determining may be stored as, for example, a condition table illustrated in FIG. 21. In FIG. 21, determining conditions are listed for each parameter which may become a basis for determining. For example, authentication information of an apparatus having a country code "JP" is nullified, authentication information of an apparatus of model "1234" or "4567" is nullified, authentication information of an apparatus of model "1474" is nullified, or authentication information of an apparatus having the certificate serial number no more than 1000 is nullified. Then, for each of these conditions, information on whether to use in determining whether to actually use in determining whether nullifying of authentication information is required is provided.

Then, when processing as illustrated in FIG. 15, in lieu of the determining of step S107, determining whether information on a subject apparatus to be issued that is described in the public-key certificate, or information being received from the lower apparatus 40 via a communications path based on a normal public-key certificate, applies to a condition being set in the condition table as one to be used for determining whether nullifying of authentication information is required enables determining whether transferring the certificate set for nullifying and/or URL for nullifying is required. In the example illustrated in FIG. 21, it can be said that nullifying of authentication information for an apparatus having the country code of "JP" and being the model of "1234" or "4567" is required is determined.

Of course, the conditions to be described in the condition table are not limited to those illustrated in FIG. 21 such that these conditions may be combined, assigned priorities, or logically operated so as to set up complex conditions.

Moreover, it is possible to have the upper apparatus 30 store therein information on the lower apparatus 40 to be a communications counterpart or equipment-information table as illustrated in FIG. 22 that describes information on its user or a public-key certificate being stored. In this way, even when detailed information is not described in the received public-key certificate, the equipment-information table is searched with ID, etc., as a key so as to obtain detailed information regarding the lower apparatus 40 of the communications counterpart for use in determining using the condition table whether nullifying authentication information is required. In a case of a system configuration such that the upper apparatus 30 remotely controls the lower apparatus 40, as it may be considered that the upper apparatus 30 normally has stored therein information corresponding to a equipment-information table, preferably this table is used.

It is noted that when searching an equipment-information table, or determining based on conditions specified in the condition table whenever receiving a public-key certificate causes the process load to increase. Thus, a method of extracting in advance an apparatus fulfilling conditions predetermined in the condition table from within the equipment-information table so as to turn the flag for nullifying the certificate ON for that apparatus for determining, as described using FIG. 15, whether nullifying of authentication information is required depending on the ON/OFF state is effective from a point of view of reducing the process load.

Furthermore, it is also possible to generate in advance at the upper apparatus 30 side, for an apparatus requiring nullifying of authentication information, a certificate set for nullifying and/or URL for nullifying so as to set a certificate-setting command for setting the certificate set, etc. as a command to be transmitted to the apparatus. In this way, when the subject lower apparatus 40 requests for communications to the upper apparatus 30 and the authentication succeeds, in the process of step S104 in FIG. 15, a normal command is transmitted together with the certificate-setting command to the lower apparatus 40 for causing the commands to be executed. Therefore, as the process of steps S107 through S112 is made unnecessary, the public-key certificate of the lower apparatus 40 may be nullified in a process belonging to a normal transmitting/receiving process, further simplifying the process.

In this case, it may be considered that a certificate-setting command to be transmitted to an apparatus of ID appended in the public-key certificate received from the lower apparatus 40 being set up, determines that nullifying of authentication information is necessary. It is noted that the public-key certificate received in this case being one before nullifying is the normal public-key certificate for the lower apparatus.

It is noted that registering a certificate-setting command as described above may be done manually by an operator of the upper apparatus 30 or may be done automatically by the upper apparatus 30 based on predetermined rules.

As an example of the latter, it is possible, for example, to monitor a contract validity period being registered as user information, etc. so as to register a command upon expiring of the validity period.

In addition, according to the present invention, as automatically updating to those for nullifying, a certificate set and/or communications-destination information of the lower apparatus 40 is enabled, the present invention is especially advantageous when applied for nullifying authentication information of an apparatus for which updating of a certificate is not possible by an operator where the apparatus is installed, for example, a set-top box of a cable television, or an image-forming apparatus to be a subject of remote maintenance.

Moreover while an example of requesting, when transferring a certificate set and/or URL from the upper apparatus 30 to the upper apparatus 40, to set the certificate set, etc., such requesting is not mandatory. Providing for performing at least only transferring at the upper apparatus 30 enables the setting as described above to be left to the process at the lower apparatus 40.

Furthermore, while an example of using the URL as information of communications destination is described, as long as this information is able to indicate the destination for transmitting a request for communications when the lower apparatus 40 communicates with the upper apparatus 30, it may be information described in other forms. For example, the IP address, etc., are possible.

Figure 23A:
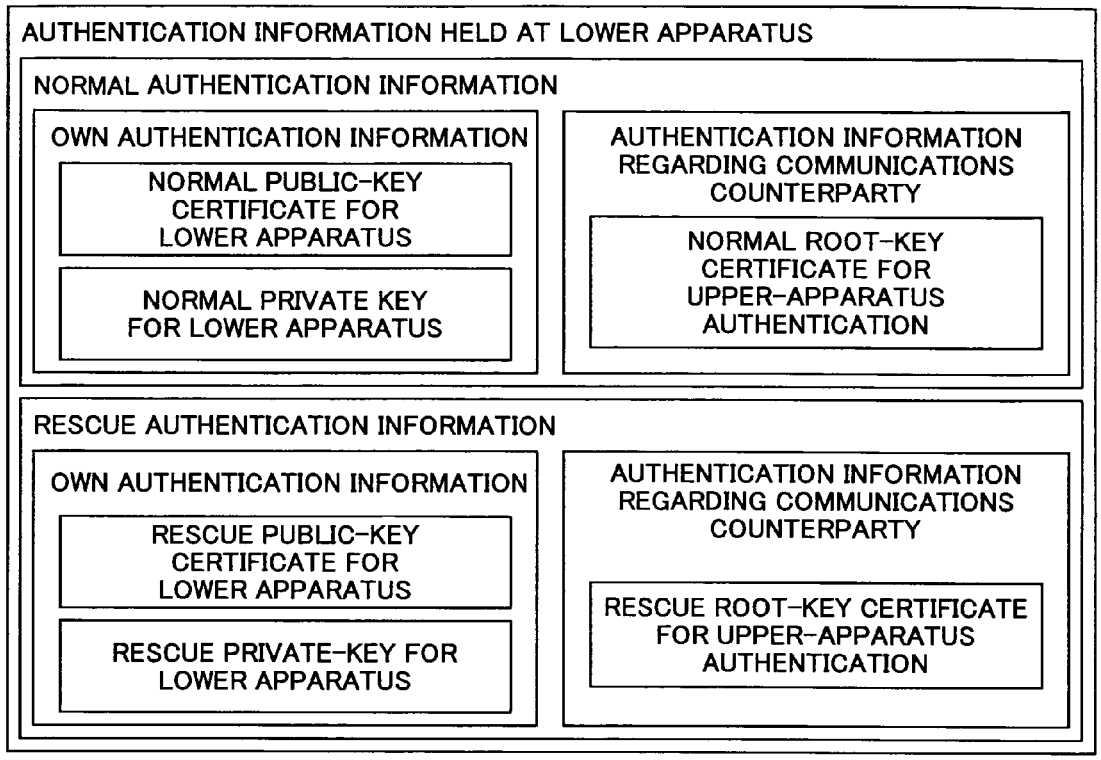
FIG. 23A is a diagram for describing authentication information being stored in the upper apparatus illustrated in FIG. 1, when using rescue authentication information.
Figure 23B:
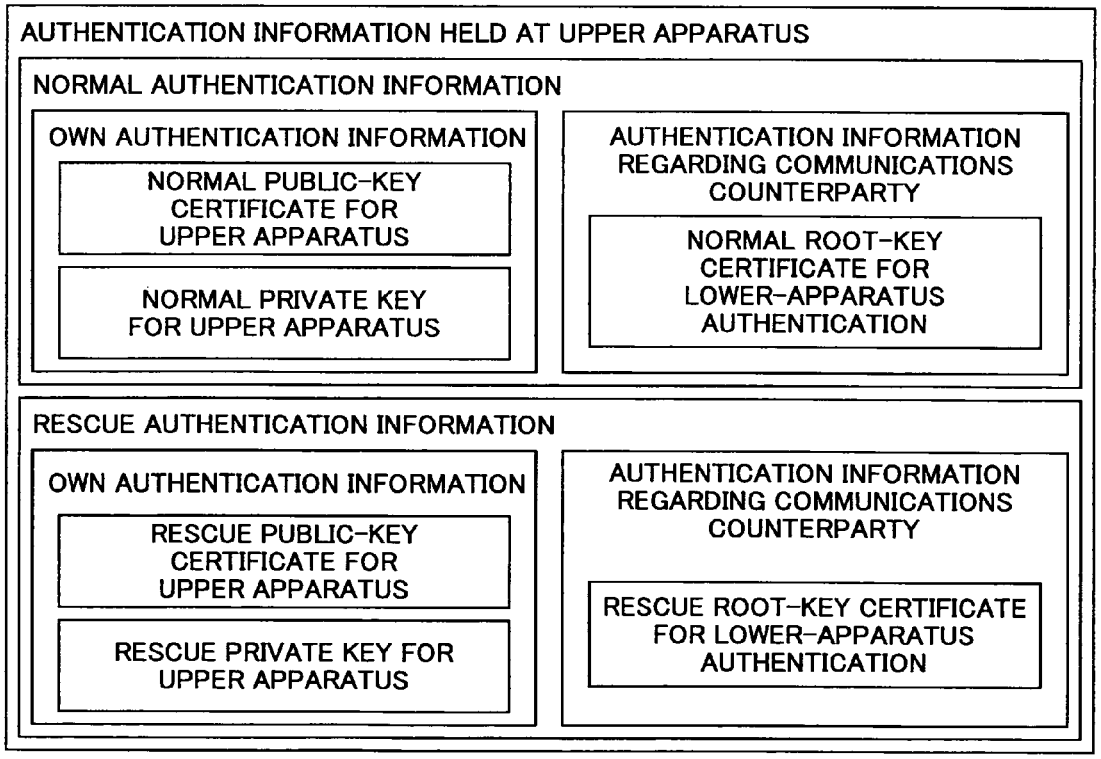
FIG. 23B is a diagram for describing authentication information being stored in the lower apparatus illustrated in FIG. 1, when using rescue authentication information.

Besides, in a communications system, it is possible to have a configuration for having the upper apparatus 30 and the lower apparatus 40 to store, in addition to normal authentication information as described in the above embodiment, authentication information for emergency (rescue) for providing an emergency communications path to prepare for cases of having failed in updating normal authentication information or having overlooked the validity period of the certificate. In this case, authentication information to be stored in the upper apparatus 30 and the lower apparatus 40 is such as illustrated in FIG. 23. Then in this case, even when nullifying normal authentication information of the lower apparatus 40, if there remains rescue authentication information, accessing the upper apparatus 30 from the communications path using the remaining rescue authentication information is still possible.

Therefore, when the rescue authentication information is being stored in the lower apparatus 40, it is preferable to nullify rescue authentication information when nullifying the corresponding normal authentication information. In this case, even for the rescue authentication information, it is possible in the same manner as normal authentication information to nullify by overwriting the certificate for nullifying or the communications-destination information for nullifying.

In addition here an example is described in which, when there is a request for communications from the lower apparatus 40 to the upper apparatus 30, the certificate set and the URL are transferred from the upper apparatus 30 to the lower apparatus 40 in response to the request. While such a process is superior in terms of being applicable even when the lower apparatus 40 resides within a firewall, a configuration may be adopted such as to request for communications from the upper apparatus 30 to the lower apparatus 40 so as to transfer the certificate set and the URL. Even in this case, transferring the certificate set for nullifying and the communications-destination information for nullifying obtains the same advantages as those described in the above.

Figure 24:
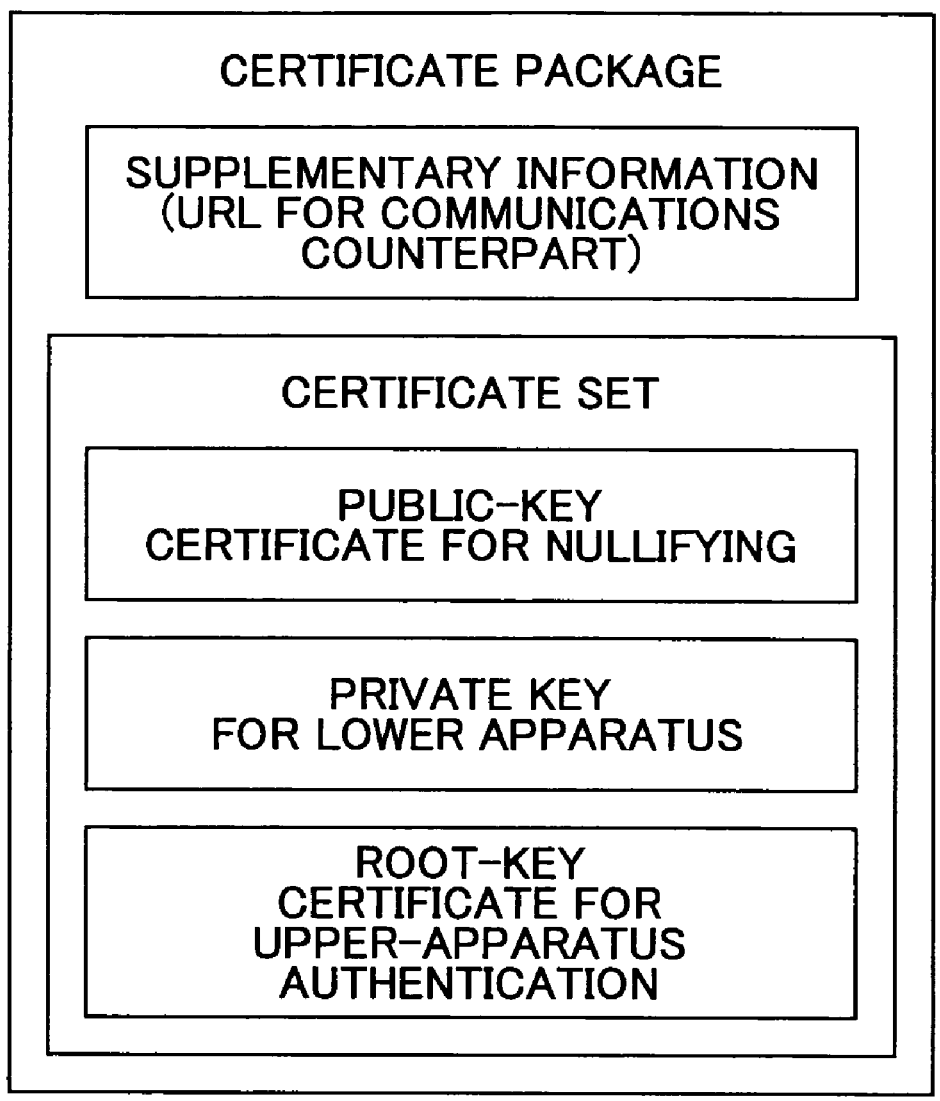
FIG. 24 is a diagram illustrating an exemplary certificate package for use in collectively transferring a certificate set for nullifying and communications-destination information.

Moreover, it is possible to provide for transferring together a certificate set and communications-destination information as a certificate package as illustrated in FIG. 24. In the communications system as described above, when updating normal authentication information of the lower apparatus 40 as it is in the valid state, providing for simultaneously transfer these items so as to have them updated enables updating a root key for use in authentication while being able to communicate with the upper apparatus 30, even in a case of having the lower apparatus 40 to store therein only one each of certificate set and communications-destination information item for communicating with the upper apparatus 30. On the other hand, in a case of trying to use the same certificate-setting command for nullifying authentication information also for normal updating, while achieving simplifying the process, such a case results in having to collectively transmit a certificate set and communications-destination information even for nullifying.

Furthermore, it is a matter of course that such process as deleting the lower apparatus 40 from a list of suitable communications counterparts may be performed in addition to the transferring of the certificate set for nullifying and communications-destination information for nullifying as described above. It is noted that, as performing such process causes authentication in the upper apparatus 30 of the lower apparatus 40 to fail, making impossible maintaining a secure communications path according to the SSL with the lower apparatus 40, such process is to be performed after transferring a certificate for nullifying, etc.

Besides, in the embodiment as described above, an example is described for a case of the upper apparatus 30 and the lower apparatus 40 authenticating according to the SSL as described using FIG. 27 or 29. However, this invention is advantageous even when this authentication is not necessarily done in such a manner as described in the above.

TLS (Transport Layer Security), having improved on the SSL, that is also known is of course applicable when authenticating based on this protocol.

Moreover, in the embodiment as described above, while an example is described in which the upper apparatus 30 generates a certificate set for nullifying, it is possible to provide for the upper apparatus 30 to request a CA to cause the CA to issue the certificate set. Then in this case, it is preferable to cause the same CA as the CA having issued a certificate set regarding normal authentication information held at the lower apparatus 40, to issue a certificate set for nullifying. Constructing such a system configuration enables grasping, in a case that even at the CA side the certificate issued by the CA itself is nullified, of the fact that the certificate is nullified. Moreover, providing for the CA holding certificates issued in the past enables using this information to modify a portion of the information so as to easily issue a certificate set for nullifying.

Figure 25:
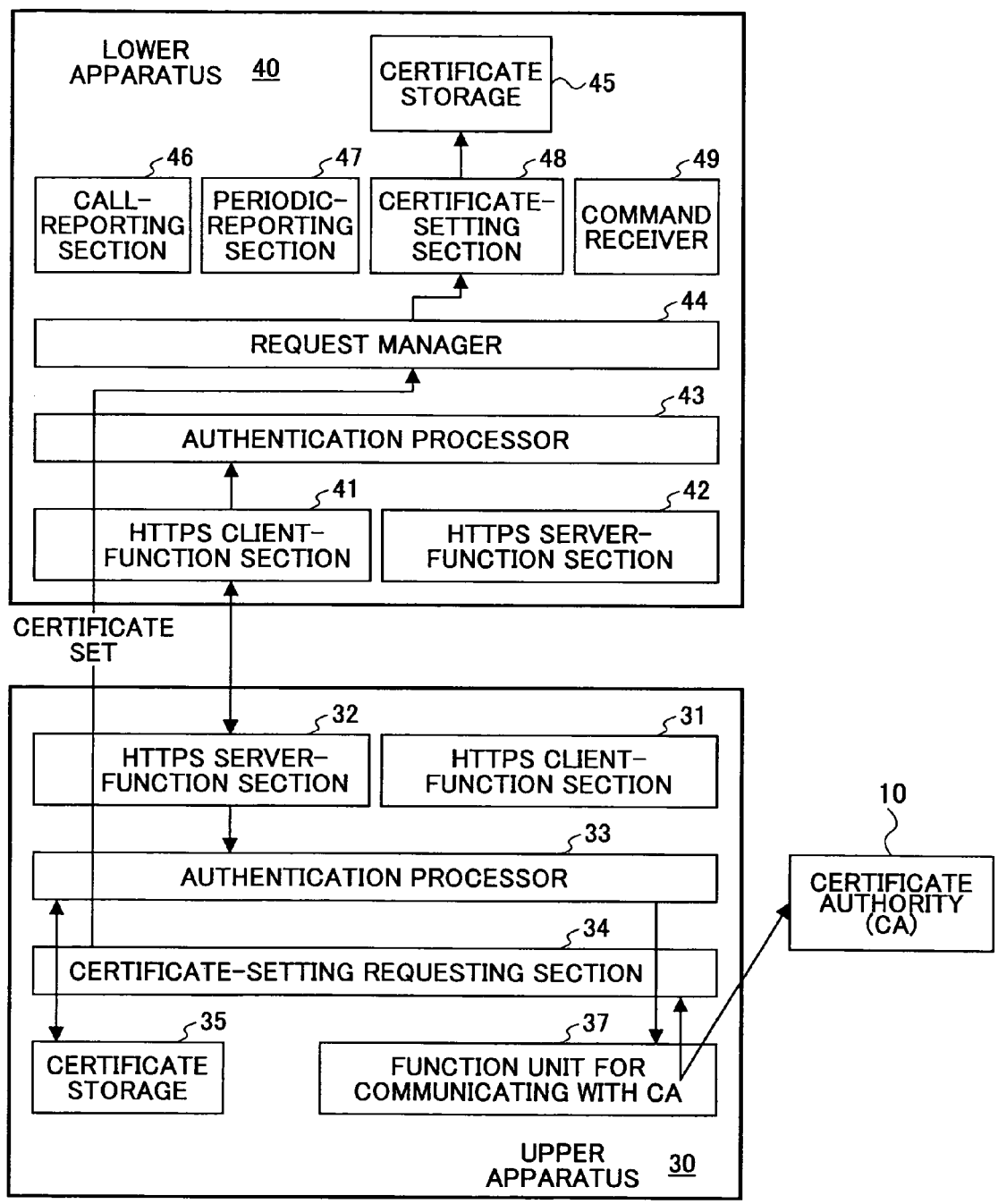
FIG. 25 is a functional block diagram illustrating a functional configuration of portions related to features of the present invention, for an upper apparatus and a lower apparatus in another exemplary configuration of the communications system of the present invention.

In FIG. 25 is illustrated a functional configuration corresponding to one illustrated in FIG. 3 of the upper apparatus 30 and the lower apparatus 40 in such a case as described above.

In this case, a communications-function unit for communicating with CA 37 being provided in lieu of the nullifying-information generating section 36 provides for functioning to communicate with a certificate authority such as a CA 10, requesting for issuing a certificate set for use in authenticating by the lower apparatus 40 itself or the upper apparatus 30 itself and a certificate set for nullifying authentication information of the lower apparatus 40, and receiving the issued certificate sets. Then, when required, this communications-function unit for communicating with CA 37 preferably provides for obtaining the certificate set for nullifying from the CA 10.

It is noted that, as is done here, communications between the upper apparatus 30 and the CA 10, taking into account security considerations, are preferably conducted via a network using leased lines. Therefore, here the SSL is not used as it is not possible to connect from outside. However, when using the SSL, a communication may be requested from the HTTPS client-function unit 31 to the certificate authority.

Figure 26:
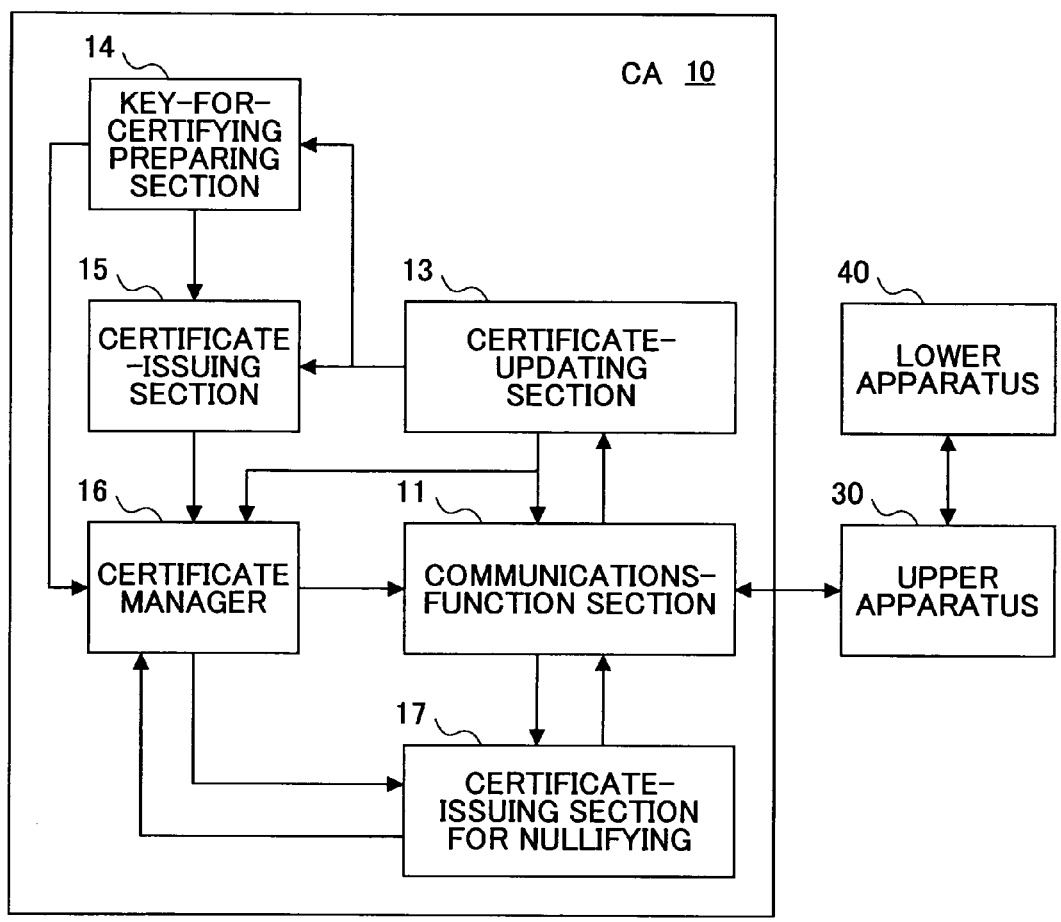
FIG. 26 is a functional block diagram illustrating a functional configuration of portions related to the present invention, for a CA as illustrated in FIG. 25.

Moreover, in FIG. 26 is illustrated a functional configuration of portions related to the present invention, for the CA 10.

As illustrated, the CA 10 comprises a communications-function section 11, a certificate-updating section 13, a key-for-certifying preparing section 14, a certificate-issuing section 15, and a certificate manager 16, and a nullifying-certificate issuing section 17.

The communications-function section 11 has a function of communicating with the upper apparatus 30, causing each section of the apparatus to execute operations such as receiving a request for issuing a certificate set and transmitting a certificate set issued, as well as operations according to a request and a data item received, and returning a response to the requester.

It is noted that when using the SSL for communicating with the upper apparatus 30, it is possible for setting the communications-function section 11 to have a function of such section as the HTTPS server-function section or the HTTPS client-function section. In this case, an authentication processor, as in the cases of the upper apparatus 30 and the lower apparatus 40, is provided so as to provide for authenticating using an appropriate certificate.

The certificate-updating section 13 has a function of, when there is a request for issuing a certificate from the upper apparatus 30, causing the key-for-certifying preparing section 14 and the certificate-issuing section 15 to issue a new certificate set of the target lower apparatus 40 so as to cause the key-for-certifying preparing section 14 and the certificate-issuing section 15 to transmit the set to the upper apparatus 30 from the certificate manager 16 via the communications-function section 11.

The key-for-certifying preparing section 14 functions as key-for-certifying preparing means for preparing a root-private key being a private key for certifying that is used in preparing a digital signature, and a root key being a public key for certifying (a certifying key) corresponding to the root-private key that is for confirming the validity of the digital certificate.

The certificate-issuing section 15 has a function of issuing to the upper apparatus 30 and the lower apparatus 40 a public key for use in authenticating according to the SSL protocol and its corresponding private key. Then in addition, it functions as certificate-issuing means for applying to the respectively issued public keys a digital signature using a root-private key prepared at the key-for-certifying preparing section 14 so as to issue a public-key certificate. Moreover, issuing a root-key certificate having applied a digital signature to a root key is also a function of this certificate-issuing section 15.

The certificate manager 16 functions as certificate-managing means for managing a digital certificate issued by the certificate-issuing section 15, a root-private key used in the preparation thereof, and a root key corresponding to the root-private key. Then, the certificate and the keys are stored together with information on the validity and the subject, ID, whether updated or nullified thereof.

The nullifying-certificate issuing section 17 has functions, when there is from the upper apparatus 30 a request for issuing a certificate for nullifying, of obtaining from the certificate-managing section 16 a certificate set issued to a subject apparatus, modifying a part of the certificate set so as to issue a certificate set for nullifying, and transmitting the issued certificate set via the communications-function section 11 to the upper apparatus 30. In this case, it is preferable to register in the certificate-managing section 16 information indicating that the certificate set for nullifying is issued. A configuration of a certificate set for nullifying is described herein.

Then, the functions of each of the sections as described above are implemented by the CPU of the CA 10 executing a required control program so as to control the operation of each of the sections of the CA 10.

Integrally providing such CA as described above with the upper apparatus 30 is not prevented from. In this case, while components such as a CPU, a ROM, or a RAM, etc., for implementing the CA may be provided discretely, it is possible to cause the CPU to execute suitable software so as to cause the executed software to function as a CA.

In such a case, the communications between the CA and the upper apparatus 30 being integrated with the CA are to include inter-process communications between a process for causing hardware to function as a CA and a process for causing the hardware to function as the upper apparatus 30.

Moreover, the program according to the invention, causes the computer controlling the upper apparatus 30 to implement the functions as described above, and causes the computer to execute such a program obtains the advantages as described above.

While such a program may be stored in storage means such as a ROM or a HDD, etc., that is comprised in the computer from the beginning, it may also be recorded in a CD-ROM or a flexible disk being a recording medium, or an non-volatile recording medium (memory) such as a SRAM, an EEPROM, a memory card, etc., for provision. Installing in the computer the program stored in the memory so as to cause the CPU to execute the program, or reading out this program from the memory into the CPU so as to cause the CPU to execute the program enables causes each procedure as described above to be executed.

Furthermore, downloading from a piece of external equipment, being connected to a network, comprising a recording medium having recorded therein a program, the program, or downloading from a piece of external equipment having stored a program in storage means the program so as to cause the program to be executed is also possible.

The present application is based on the Japanese Priority Application No. 2004-004720 filed on Jan. 9, 2004 and Internal Priority Application No. 2004-360616 filed on Dec. 13, 2004, the entire contents of which are hereby incorporated by reference.

The invention claimed is:

1. A method for nullifying, by a communications apparatus, a public-key certificate for use by a communications counterpart of the communications apparatus in an authentication process, comprising:

transferring to the communications counterpart, by said communications apparatus, a nullifying public-key certificate configured to nullify the public-key certificate, when determining, based on the public-key certificate being a valid public-key certificate received from said communications counterpart or information received via a communications path based on the public-key certificate, that said public-key certificate is to be nullified; and setting, by the communications counterpart, the nullifying public-key certificate as the public-key certificate, wherein said nullifying public-key certificate has a format that is valid as the public-key certificate and includes content to nullify the nullifying public-key certificate itself; and said nullifying public-key certificate is configured to pass a format check for confirming a format of the nullifying public-key certificate and a content check for confirming integrity of the content of the nullifying public-key certificate, while including the content to nullify the nullifying public-key certificate itself.

2. The method as claimed in claim 1, wherein said nullifying public-key certificate is provided with an unsuitable validity period.

3. The method as claimed in claim 1, wherein said nullifying public-key certificate is provided with unsuitable issuer information.

4. The method as claimed in claim 1, further comprising:
requesting, by said communications apparatus, said communications counterpart to set, when transferring said nullifying public-key certificate a nullifying private-key or nullifying communications-destination information, the transferred nullifying public-key certificate, the transferred nullifying private-key, or the transferred nullifying communications-destination information.

5. An apparatus configured to nullify a public-key certificate for use by a communications counterpart in an authentication process, comprising:
a processor including
a receiving unit configured to receive the public-key certificate being a valid public-key certificate from said communications counterpart; and
a transferring unit configured to transfer a nullifying public-key certificate to said communications counterpart, when determining, based on the received public-key certificate or information received via a communications path based on the public-key certificate, that said public-key certificate is to be nullified, wherein
said nullifying public-key certificate has a format that is valid as the public-key certificate and includes content to nullify the nullifying public-key certificate itself; and
said nullifying public-key certificate is configured to pass a format check for confirming a format of the nullifying public-key certificate and a content check for confirming integrity of the content of the nullifying public-key certificate, while including the content to nullify the nullifying public-key certificate itself.

6. The apparatus as claimed in claim 5, wherein said nullifying public-key certificate is provided with an unsuitable validity period.

7. The apparatus as claimed in claim 5, wherein said nullifying public-key certificate is provided with unsuitable issuer information.

8. The apparatus as claimed in claim 5, further comprising:
a requesting unit configured to request said communications counterpart to set, when transferring said nullifying public-key certificate, a nullifying private-key, or nullifying communications-destination information, the transferred nullifying public-key certificate, the transferred nullifying private-key, or the transferred nullifying communications-destination information.

9. A system for nullifying digital certificates including an apparatus configured to nullify a public-key certificate for use by a communications counterpart in an authentication process and a communications apparatus to be the communications counterpart of the apparatus, comprising:
said apparatus including
a processor including
a receiving unit configured to receive the public-key certificate being a valid public-key certificate from said communications counterpart; and
a transferring unit configured to transfer a nullifying public-key certificate to said communications counterpart, when determining, based on the received public-key certificate or information received via a communications path based on the public-key certificate, that said public-key certificate is to be nullified; and said communications apparatus includes
a setting unit configured to overwrite, when receiving said nullifying public-key certificate from said apparatus, the public-key certificate being stored with the received nullifying public-key certificate, wherein
said nullifying public-key certificate has a format that is valid as the public-key certificate and includes content to nullify the nullifying public-key certificate itself; and
said nullifying public-key certificate is configured to pass a format check for confirming a format of the nullifying public-key certificate and a content check for confirming integrity of the content of the nullifying public-key certificate, while including the content to nullify the nullifying public-key certificate itself.

10. The system as claimed in claim 9, wherein said nullifying public-key certificate is provided with an unsuitable validity period.

11. The system as claimed in claim 9, wherein said nullifying public-key certificate is provided with unsuitable issuer information.

12. The system as claimed in claim 9, wherein said apparatus comprises a requesting unit configured to request said communications counterpart to set, when transferring said nullifying public-key certificate, a nullifying private-key or nullifying communications-destination information, the transferred nullifying public-key certificate, the transferred nullifying private-key, or the transferred nullifying communications-destination information.

13. A computer-readable storage medium having embedded therein instructions, which when executed by a processor, cause the processor to perform a method of nullifying a public-key certificate for use by a communications counterpart in an authentication process, the method comprising:
receiving the public-key certificate being a valid public-key certificate from said communications counterpart; and
transferring a nullifying public-key certificate to said communications counterpart, when determining based on the received public-key certificate or information received via a communications path based on the public-key certificate that said public-key certificate is to be nullified, wherein
said nullifying public-key certificate has a format that is valid as the public-key certificate and includes content to nullify the nullifying public-key certificate itself; and
said nullifying public-key certificate is configured to pass a format check for confirming a format of the nullifying public-key certificate and a content check for confirming integrity of the content of the nullifying public-key certificate, while including the content to nullify the nullifying public-key certificate itself.

14. The computer-readable storage medium as claimed in claim 13, wherein said public-key certificate is provided with an unsuitable validity period.

15. The computer-readable storage medium as claimed in claim 13, wherein said public-key certificate is provided with unsuitable issuer information.

16. The computer-readable storage medium as claimed in claim 13, further comprising:
requesting said communications counterpart to set, when transferring said nullifying public-key certificate, a nullifying private-key, or nullifying communications-destination information, the transferred nullifying public-key certificate, the transferred nullifying private-key, or the transferred nullifying communications-destination information.

* * * * *